US012106156B2

(12) United States Patent
Carre et al.

(10) Patent No.: US 12,106,156 B2
(45) Date of Patent: Oct. 1, 2024

(54) USER INTERFACE TECHNIQUES FOR AN INFRASTRUCTURE ORCHESTRATION SERVICE

(71) Applicant: Oracle International Corporation, Redwood Shores, CA (US)

(72) Inventors: Arthur Carre, Seattle, WA (US); Josh Max Rubinstein, Coupeville, WA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 17/001,626

(22) Filed: Aug. 24, 2020

(65) Prior Publication Data

US 2021/0223923 A1 Jul. 22, 2021

Related U.S. Application Data

(60) Provisional application No. 62/963,452, filed on Jan. 20, 2020, provisional application No. 62/963,477, (Continued)

(51) Int. Cl.
*G06F 9/50* (2006.01)
*G06F 3/0484* (2022.01)
(Continued)

(52) U.S. Cl.
CPC .......... *G06F 9/5061* (2013.01); *G06F 3/0484* (2013.01); *G06F 8/60* (2013.01);
(Continued)

(58) Field of Classification Search
None
See application file for complete search history.

(56) References Cited

U.S. PATENT DOCUMENTS 8,171,482 B1 * 5/2012 Vlaovic .............. G06F 9/44521
718/104
8,266,616 B1 * 9/2012 Jacquot .................... G06F 8/65
717/121

(Continued)

FOREIGN PATENT DOCUMENTS

WO 2015184158 A1 12/2015

OTHER PUBLICATIONS

International Application No. PCT/US2020/060081, International Search Report and Written Opinion mailed on Mar. 1, 2021, 14 pages.

*Primary Examiner* — Matthew Ell
*Assistant Examiner* — Koorosh Nehchiri
(74) *Attorney, Agent, or Firm* — Kilpatrick Townsend & Stockton LLP

(57) ABSTRACT

Techniques are disclosed for providing a number of user interfaces. A computing system may execute a declarative infrastructure provisioner. The computing system may provide declarative instructions and instruct the declarative infrastructure provision to deploy a plurality of infrastructure resources and a plurality of artifacts. One example user interface may provide a global view of the plurality of infrastructure components and artifacts. Another example user interface may provide corresponding states and change activity of the plurality of infrastructure components and artifacts. Yet another user interface may be provided that presents similarities and/or differences between a locally-generated safety plan indicating first changes for a computing environment and a remotely-generated safety plan indicating second changes for the computing environment.

20 Claims, 17 Drawing Sheets

Related U.S. Application Data filed on Jan. 20, 2020, provisional application No. 62/963,413, filed on Jan. 20, 2020, provisional application No. 62/963,491, filed on Jan. 20, 2020, provisional application No. 62/963,486, filed on Jan. 20, 2020, provisional application No. 62/963,456, filed on Jan. 20, 2020, provisional application No. 62/963,489, filed on Jan. 20, 2020, provisional application No. 62/963,335, filed on Jan. 20, 2020, provisional application No. 62/963,480, filed on Jan. 20, 2020, provisional application No. 62/963,478, filed on Jan. 20, 2020, provisional application No. 62/963,481, filed on Jan. 20, 2020.

(51) Int. Cl.

| | | |
|---|---|---|
| *G06F 8/60* | (2018.01) | |
| *G06F 8/71* | (2018.01) | |
| *G06F 9/38* | (2018.01) | |
| *G06F 9/4401* | (2018.01) | |
| *G06F 9/445* | (2018.01) | |
| *G06F 9/451* | (2018.01) | |
| *G06F 9/48* | (2006.01) | |
| *G06F 11/07* | (2006.01) | |
| *G06F 11/14* | (2006.01) | |
| *G06F 11/32* | (2006.01) | |
| *G06F 11/36* | (2006.01) | |
| *G06F 16/901* | (2019.01) | |
| *H04L 41/0806* | (2022.01) | |
| *H04L 41/0816* | (2022.01) | |
| *H04L 41/50* | (2022.01) | |
| *H04L 41/5041* | (2022.01) | |
| *H04L 41/5054* | (2022.01) | |
| *H04L 67/00* | (2022.01) | |
| *H04L 67/10* | (2022.01) | |
| *H04L 67/1008* | (2022.01) | |
| *H04L 67/1031* | (2022.01) | |
| *H04L 67/566* | (2022.01) | |
| *G06F 8/61* | (2018.01) | |

(52) U.S. Cl.
CPC .............. *G06F 8/71* (2013.01); *G06F 9/3836* (2013.01); *G06F 9/4411* (2013.01); *G06F 9/44505* (2013.01); *G06F 9/451* (2018.02); *G06F 9/485* (2013.01); *G06F 9/4856* (2013.01); *G06F 9/5011* (2013.01); *G06F 9/5022* (2013.01); *G06F 9/5027* (2013.01); *G06F 9/5038* (2013.01); *G06F 9/505* (2013.01); *G06F 9/5072* (2013.01); *G06F 9/5077* (2013.01); *G06F 11/0757* (2013.01); *G06F 11/1469* (2013.01); *G06F 11/327* (2013.01); *G06F 11/3664* (2013.01); *G06F 11/3684* (2013.01); *G06F 16/9024* (2019.01); *H04L 41/0806* (2013.01); *H04L 41/0816* (2013.01); *H04L 41/5041* (2013.01); *H04L 41/5048* (2013.01); *H04L 41/5054* (2013.01); *H04L 41/5096* (2013.01); *H04L 67/10* (2013.01); *H04L 67/1008* (2013.01); *H04L 67/1031* (2013.01); *H04L 67/34* (2013.01); *H04L 67/566* (2022.05); *G06F 8/61* (2013.01); *G06F 11/0709* (2013.01); *G06F 11/0751* (2013.01); *G06F 11/0793* (2013.01)

(56) References Cited

U.S. PATENT DOCUMENTS

| | | | |
|---|---|---|---|
| 8,997,088 B2* | 3/2015 | Gurikar | G06F 8/61 |
| | | | 717/173 |
| 9,535,754 B1* | 1/2017 | Suarez | G06F 9/4881 |
| 9,621,435 B2* | 4/2017 | Vasudevan | H04L 41/5054 |
| 9,826,045 B2* | 11/2017 | Straub | H04L 67/34 |
| 9,830,135 B2* | 11/2017 | Tripathi | G06F 9/44505 |
| 9,851,953 B2* | 12/2017 | Straub | G06F 8/20 |
| 10,212,029 B2* | 2/2019 | Shaker | H04L 41/0803 |
| 11,010,191 B1* | 5/2021 | Hornbeck | H04L 67/133 |
| 11,321,137 B2* | 5/2022 | Barsalou | H04L 41/0816 |
| 2013/0117749 A1* | 5/2013 | Mechelke | G06F 8/63 |
| | | | 718/102 |
| 2014/0317166 A1* | 10/2014 | Iyoob | G06F 9/45558 |
| | | | 709/201 |
| 2015/0058467 A1* | 2/2015 | Douglas | H04L 67/51 |
| | | | 709/223 |
| 2015/0350021 A1* | 12/2015 | Morris | H04L 67/10 |
| | | | 709/224 |
| 2017/0041189 A1* | 2/2017 | Aswathanarayana | |
| | | | H04L 41/0843 |
| 2018/0060101 A1* | 3/2018 | Zhu | H04L 63/029 |
| 2018/0167275 A1* | 6/2018 | Kovacheva | H04L 41/0816 |
| 2018/0293152 A1* | 10/2018 | Sherafat Kazemzadeh | |
| | | | G06F 11/368 |
| 2019/0028336 A1* | 1/2019 | Coronado | H04L 67/34 |
| 2019/0180034 A1* | 6/2019 | Hinton | G06F 21/577 |
| 2019/0196800 A1* | 6/2019 | Shodhan | G06F 8/38 |
| 2020/0014607 A1* | 1/2020 | Gangadhar | H04L 67/34 |
| 2020/0159573 A1* | 5/2020 | Dobrev | G06F 8/38 |
| 2020/0159690 A1* | 5/2020 | J | G06N 20/20 |
| 2021/0055917 A1* | 2/2021 | Khakare | G06F 9/547 |
| 2021/0334146 A1* | 10/2021 | Kulkarni | G06F 8/433 |

* cited by examiner

FIG. 13

USER INTERFACE TECHNIQUES FOR AN INFRASTRUCTURE ORCHESTRATION SERVICE

CROSS-REFERENCE TO RELATED APPLICATIONS

The present application is a non-provisional application of, and claims the benefit and priority under 35 U.S.C. 119(e) of the following U.S. Provisional Applications, the entire contents of which are incorporated by reference for all purposes: U.S. Provisional Application No. 62/963,335, filed Jan. 20, 2020, entitled "TECHNIQUES FOR DEPLOYING INFRASTRUCTURE RESOURCES WITH A DECLARATIVE PROVISIONING TOOL"; U.S. Provisional Application No. 62/963,413, filed Jan. 20, 2020, entitled "TECHNIQUES FOR DETECTING DRIFT IN A DEPLOYMENT ORCHESTRATOR"; U.S. Provisional Application No. 62/963,456, filed Jan. 20, 2020, entitled "USER INTERFACE TECHNIQUES FOR AN INFRASTRUCTURE ORCHESTRATION SERVICE"; U.S. Provisional Application No. 62/963,477, filed Jan. 20, 2020, entitled "TECHNIQUES FOR UTILIZING DIRECTED ACYCLIC GRAPHS FOR DEPLOYMENT INSTRUCTIONS"; U.S. Provisional Application No. 62/963,478, filed Jan. 20, 2020, entitled "TECHNIQUES FOR RESOLVING APPLICATION UPDATES"; U.S. Provisional Application No. 62/963,480, filed Jan. 20, 2020, entitled "TECHNIQUES FOR MANAGING DEPENDENCIES OF AN ORCHESTRATION SERVICE"; U.S. Provisional Application No. 62/963,452, filed Jan. 20, 2020, entitled "TECHNIQUES FOR ROLLBACK OF AN INFRASTRUCTURE ORCHESTRATION SERVICE"; U.S. Provisional Application No. 62/963,486 filed Jan. 20, 2020, entitled "TECHNIQUES FOR DEPLOYING INFRASTRUCTURE COMPONENTS IN PHASES"; U.S. Provisional Application No. 62/963,489, filed Jan. 20, 2020, entitled "TECHNIQUES FOR MANAGING LONG-RUNNING TASKS WITH A DECLARATIVE PROVISIONER"; U.S. Provisional Application No. 62/963,481, filed Jan. 20, 2020, entitled "TECHNIQUES FOR TRANSFERRING DATA ACROSS AIR GAPS"; and U.S. Provisional Application No. 62/963,491, filed Jan. 20, 2020, entitled "TECHNIQUES FOR PREVENTING CONCURRENT EXECUTION OF DECLARATIVE INFRASTRUCTURE PROVISIONERS."

BACKGROUND

Today, cloud infrastructure services utilize many individual services to provision and deploy code and configuration (respectively) across the cloud infrastructure service's many regions. These tools require significant manual effort to use, especially given that provisioning is generally declarative and deploying code is imperative. Additionally, as the number of service teams and regions grows, the cloud infrastructure service will need to continue to grow. Some cloud infrastructure service's strategies of deploying to a larger number of smaller regions includes per-region expenditures, which may not scale well.

BRIEF SUMMARY

Techniques for providing one or more user interfaces are disclosed herein. In some embodiments, a method is disclosed. The method may comprise executing, by a computing system, a declarative infrastructure provisioner. The method may further comprise provisioning, by the computing system, a first set of infrastructure components based at least in part on providing a first set of declarative instructions to the declarative infrastructure provisioner. The method may further comprise deploying, by the computing system, a second set of software artifacts based at least in part on providing a second set of declarative instructions to the declarative infrastructure provisioner. The method may further comprise providing, by the computing system, a user interface presenting a plurality of user interface elements, the plurality of user interface elements identifying at least a first status associated with provisioning the first set of infrastructure components and a second status associated with deploying the second set of software artifacts.

In some embodiments, a system is disclosed. The system may comprise one or more processors and one or more memories storing computer-executable instructions that, when executed by the one or more processors, cause the system to perform operations. The operations may comprise executing a declarative infrastructure provisioner. The operations may further comprise provisioning a first set of infrastructure components based at least in part on providing a first set of declarative instructions to the declarative infrastructure provisioner. The operations may further comprise deploying a second set of software artifacts based at least in part on providing a second set of declarative instructions to the declarative infrastructure provisioner. The operations may further comprise providing a user interface presenting a plurality of user interface elements, the plurality of user interface elements identifying at least a first status associated with provisioning the first set of infrastructure components and a second status associated with deploying the second set of software artifacts.

In some embodiments, a non-transitory computer-readable storage medium is disclosed. The non-transitory computer-readable storage medium may comprise one or more processors and one or more memories storing computer-executable instructions that, when executed by the one or more processors, cause a computing device to perform operations. The operations may comprise executing a declarative infrastructure provisioner. The operations may further comprise provisioning a first set of infrastructure components based at least in part on providing a first set of declarative instructions to the declarative infrastructure provisioner. The operations may further comprise deploying a second set of software artifacts based at least in part on providing a second set of declarative instructions to the declarative infrastructure provisioner. The operations may further comprise providing a user interface presenting a plurality of user interface elements, the plurality of user interface elements identifying at least a first status associated with provisioning the first set of infrastructure components and a second status associated with deploying the second set of software artifacts.

BRIEF DESCRIPTION OF THE DRAWINGS

To easily identify the discussion of any particular element or act, the most significant digit or digits in a reference number refer to the figure number in which that element is first introduced.

FIG. 13 is a schematic diagram illustrating an example user interface that shows an example safety plan, according to at least one embodiment.

DETAILED DESCRIPTION

Figure 1:
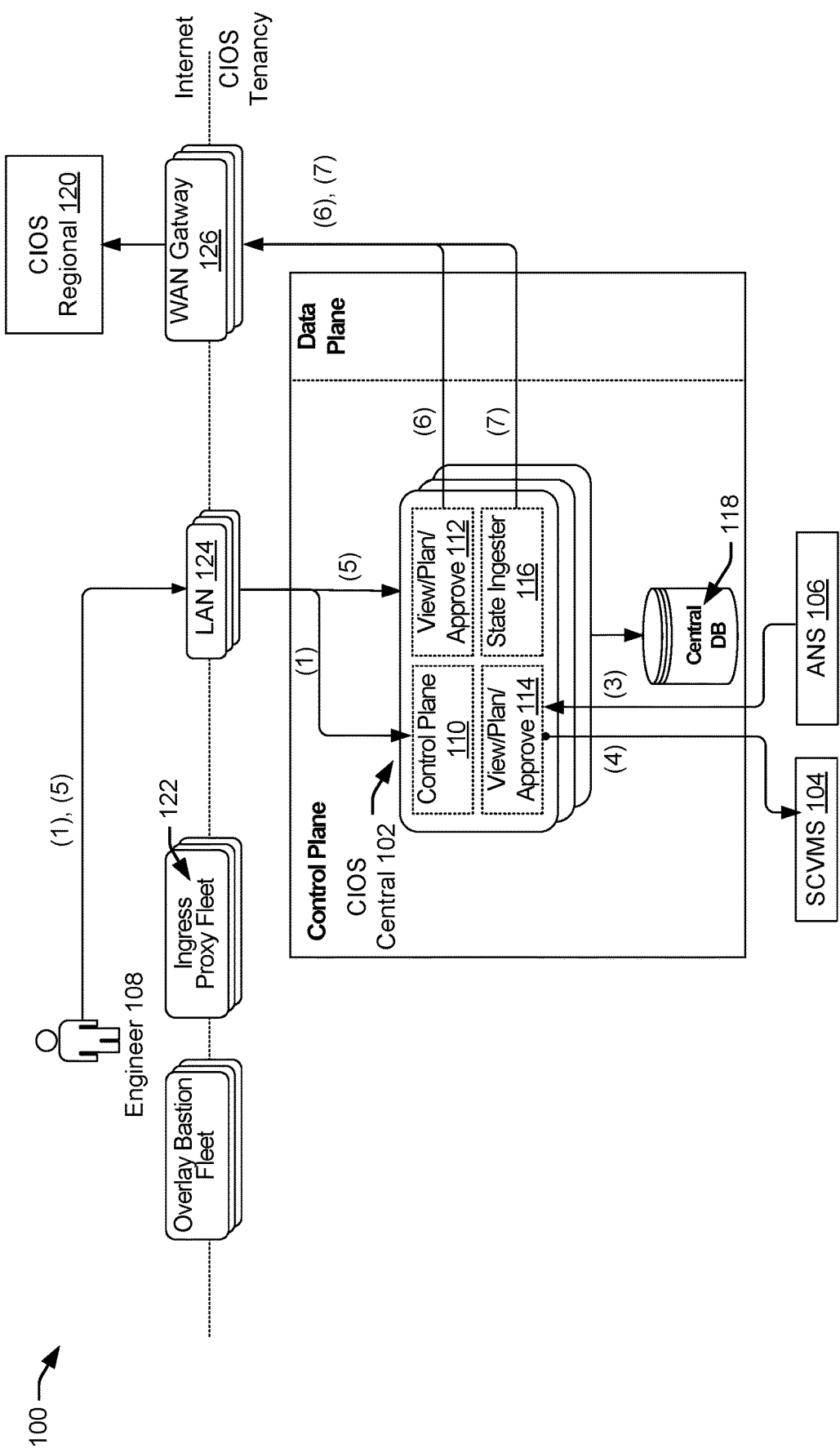
FIG. 1 is a block diagram of an architecture for implementing at least some elements of a cloud infrastructure orchestration service, according to at least one embodiment.

In some examples, infrastructure as a service (IaaS) is one particular type of cloud computing. IaaS can be configured to provide virtualized computing resources over a public network (e.g., the Internet). In some examples, IaaS is one of the three main categories (or sub-categories) of cloud computing services. Most consider the other main categories to be software as a service (Saas) and platform as a service (PaaS), and sometimes SaaS may be considered a broader category, encompassing both PaaS and IaaS, with even some considering IaaS to be a sub-category of PaaS as well.

In an IaaS model, a cloud computing provider can host the infrastructure components (e.g., servers, storage devices, network nodes (e.g., hardware), deployment software, platform virtualization (e.g., a hypervisor layer), or the like).

In some cases, an IaaS provider may also supply a variety of services to accompany those infrastructure components (e.g., billing, monitoring, logging, security, load balancing and clustering, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) in each VM, deploy middleware, such as databases, create storage buckets for workloads and backups, and install even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., selling) IaaS. An entity might also opt to deploy a private cloud, becoming its own provider of infrastructure services.

In some examples, IaaS deployment is the process of putting a new application, or a new version, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different problems for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more security group rules provisioned to define how the security of the network will be set up and one or more virtual machines (VMs). Other infrastructure elements may also be provisioned, such as a load balancer, a database, or the like. As more and more infrastructure elements are desired and/or added, the infrastructure may incrementally evolve.

As noted above, one way to provision the infrastructure is to describe it declaratively. As such, the configuration file may be a declarative file that merely describes each of the infrastructure components noted above and how they interact. The configuration file can describe the resource and the relevant fields needed to create the element, and then as other elements can be described that reference the previously described elements. In some examples, a provisioning tool can then generate a workflow for creating and managing the elements that are described in the configuration file.

In some instances, the workflow of the provisioning tool may be configured to perform various commands. One function that can be performed is view reconciliation, where the provisioning tool can compare the view of the current infrastructure (e.g., the expected state of the infrastructure) with how the infrastructure is actually running. In some instances, performing the view reconciliation function may include querying various resource providers or infrastructure resources to identify what resources are actually running. Another function that the provisioning tool can perform is plan generation, where the provisioning tool can compare the actually running infrastructure components with what the provisioning tool wants the state to look like (e.g., the desired configuration). In other words, the plan generation function can determine what changes need to be made to bring the resources up to the most current expectations. In some instances, a third function is the execution (e.g., apply) function, where the provisioning tool can execute the plan generated by the plan generation function.

In general, provisioning tools may be configured take the configuration file, parse the declarative information included therein, and programmatically/automatically determine the order in which the resources need to be provisioned in order to execute the plan. For example, if the VPC needs to be booted before the security group rules and VMs are booted, then the provisioning tool will be able to make that determination and implement the booting in that order without user intervention and/or without that information necessarily being included in the configuration file.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

As noted above, generally there are two different tools used to handle each of the provisioning of infrastructure resources and the deployments of code to control the infrastructure resources, with orchestration between the two tools being performed manually. However, at scale, manual implementation always leads to deviations. Thus, an automated tool that can both provision and deploy a virtual infrastructure enables more efficient and reliable techniques for implementing a virtual cloud environment.

In some examples, when two tools are used, issues can arise when a user manually makes changes to the code between the provisioning phase and the deployment phase. As described herein, a technique that uses a single tool for both provisioning and deploying can alleviate that by automating the process, such that there isn't an opportunity for manual code changes. It may be the case, that a slight change to the way in which one user codes something, can create major issues in the deployment phase. In some examples, the first time an operator performs an action in a new region (e.g., a typo in the code), the object that was coded with the typo may be that way forever. If the application is deployed with that typo, and the application is not sensitive to that typo (e.g., it still works), it is possible that some time down the road, an additional code change could become sensitive to that typo, and crash the entire system. Thus, the techniques provided herein can remove the gap between provisioning and deployment that can often lead to problems.

In general, modeling deployments is declarative such that a configuration file can be used to declare the infrastructure resources. For example, create, read, update, delete (CRUD) instructions are generally used to generate deployment files using general Representational State Transfer (REST) concepts (e.g., REST Application Programming Interfaces (APIs)). However, deployment itself doesn't generally follow the same concept. Additionally, while the infrastructure provisioning tools tend to be really powerful and/or expressive, the tools for deployment tend to be much more restrictive regarding the operations they can perform (e.g., they are imperative as opposed to declarative). Thus, there has been a long-felt need for a tool that can handle both functional requirements (e.g., provisioning and deployment of infrastructure elements) within a cloud environment.

In some examples, techniques for implementing a cloud infrastructure orchestration service (CIOS) are described herein. Such techniques, as described briefly above, can be configured to manage both provisioning and deploying of infrastructure assets within a cloud environment. In some instances, the CIOS can include two classes of service: the Central and Regional components (e.g., CIOS Central and CIOS Regional). The following terms will be used throughout:

Infrastructure component—A long-lived piece of infrastructure that supports running code. Examples: a deployment application, a load balancer, a domain name system (DNS) entry, an object storage bucket, etc.

Artifact—Code being deployed to a deployment application or a Kubernetes engine cluster, or configuration information (hereinafter, "config") being applied to an infrastructure component. These may be read-only resources.

Deployment task—A short-lived task that is often associated with deploying or testing code. Additionally, the deployments tasks are modeled as resources that live no longer than the release that creates them.
  Examples: "deploy $artifact to $environment," "watch $alarm for 10 minutes," "execute $testSuite," or "wait for $manualApproval"
  For example, CIOS can model a deployment orchestrator deployment as the creation of a resource that transitions to the Available state when it completes.
  Because CIOS maintains the state of its cloud infrastructure service declarative provisioner, CIOS can control the lifecycle of these short-lived resources as it relates to releases.

Resource—a CRUD'able resource.
  CIOS models each of the constructs listed above as a resource. The next section discusses this modeling in detail.

Flock—CIOS's model encapsulating a control plane and all its components. Exists primarily to model ownership of and point at the infrastructure components.

Flock config—Describes the set of all infrastructure components, artifacts, and deployment tasks associated with a single service.

Each Flock has exactly one Flock config. Flock configs are checked in to source control.

Flock configs are declarative. They expect CIOS to provide realm, region, ad, and artifact versions as input.

Flocks are granular-a Flock consists of a single service and supporting infrastructure.

State—A point-in-time snapshot of the state of every resource in the flock.

Release—A tuple of a specific version of a flock config and a specific version of every artifact that it references.

Think of a release as describing a state that may not yet exist.

Release plan—The set of steps that the CIOS would take to transition all regions from their current state to the state described by a release.

Release plans have a finite number of steps and a well-defined start and end time.

Apply—This is a noun. A single attempt to execute a Release plan. An Execution changes the current State of the Flock.

CIOS can be described as an orchestration layer that applies configuration to downstream systems (e.g., world-wide). It is designed to allow world-wide infrastructure provisioning and code deployment with no manual effort from service teams (e.g., beyond an initial approval in some instances). The high level responsibilities of CIOS include, but are not limited to:

Providing teams with a view in to the current state of resources managed by CIOS, including any in-flight change activity.

Helping teams plan and release new changes.

Coordinating activity across various downstream systems within a region to execute approved release plans with no human intervention.

Coordinating activity across regions/realms to execute approved release plans world-wide.

In some examples, CIOS handles onboarding by enabling teams to provide CIOS with configuration information via checked-in code. Additionally, CIOS can automate more things, so this is a heavier-weight exercise than in previous implementations. In some instances, CIOS handles pre-deployment by offering teams the ability to automatically deploy and test code. In some instances, CIOS can handle the writing of change management (CM) policy by enabling automatically generating plans to roll out new artifacts (e.g., world-wide) when a team builds them. It can do this by inspecting the current state of each region and the current CIOS config (which, can itself be an artifact). Additionally, teams can inspect these plans, and may iterate on them by changing the CIOS config and asking CIOS to re-plan. Once the team is satisfied with a plan, they can create a "release" that references the plan. The plan can then be marked as approved or rejected. While teams can still write CMs, they are just pointers to the CIOS plan. Thus, teams can spend less time reasoning about the plan. Plans are more accurate because they are machine generated. Plans are almost too detailed for human consumption; however, it can be displayed via a sophisticated user interface (UI).

In some examples, CIOS can handle execution of CMs by automatically executing the deployment plan. Once release plan has been created and approved, engineers no longer participate in CMs unless CIOS initiates roll-back. In some cases, this may require teams to automate tasks that are currently manual. In some examples, CIOS can handle rolling back a change management (CM) by automatically generating a plan that returns the flock to its original (e.g., pre-release) state when CIOS detects service health degradation while executing. In some examples, CIOS can handle deploying emergent/tactical changes by receiving a release plan that is scoped to a subset of regions and/or a subset of the resources managed by CIOS, and then executing the plan.

Additionally, CIOS may support primitives necessary to define fully automated world-wide deployments. For example, CIOS can measure service health by monitoring alarms and executing integration tests. CIOS can help teams quickly define roll-back behavior in the event of service degradation, then can execute it automatically. CIOS can automatically generate and display release plans and can track approval. In some instances, the language that teams use to describe desired deployment behavior may be declarative. CIOS can combine the functionality of code deployment and infrastructure config (e.g., provisioning) in one system. CIOS also supports flexible ordering across regions, and across components within a region. Teams can express ordering via checked-in config. Teams may call CIOS's planning and release APIs programmatically.

FIG. 1 depicts an architecture 100 for illustrating techniques for implementing at least CIOS Central 102. In some examples, CIOS Central 102 can be the service that handles operations at the level of a "Flock." CIOS Central 102 has a few responsibilities, including but not limited to:

Serving as an authentication gateway for Flock metadata changes and release operations.

Storing an authoritative mapping of Flock metadata to the deployment artifacts and CIOS repositories for the flock.

Coordinating global Releases across Phases and Targets.

Synchronization to enforce policies like "no more than one ongoing release to a Flock at a time."

Detecting changes to Flock configuration (config) and artifacts, and triggering a release generation on such changes.

In some examples, a source code version-control management service (SCVMS) 104 can be configured to store authoritative Flock configuration and an artifact notification service (ANS) 106 can be subscribed to by CIOS Central 102, so that CIOS Central 102 can be informed of new artifact builds. The CIOS Central 102 can then map incoming changes against the affected flocks, and initiate release planning where desired. Additionally, in some examples, an artifact push service (APS) can be invoked by CIOS Central 102, before a release to a target, to ensure any artifacts required for a successful release are present in the target's region ahead of release.

In some examples, customers (e.g., engineers) 108 can call CIOS Central 102 to CRUD flocks and/or releases, and to view the status of ongoing CIOS activity. Flock management service 110 can include one or more API's to manipulate flocks, view/plan/approve service 112 can include CRUD API's to create and approve plans, and to view a central copy of the state of all CIOS-managed resources, change monitoring service 114 can watch SCVMS 104 for changes to flock config, and can receive notifications about changes to other artifacts from ANS 106, and state ingester service 116 can create copies of regional state in CIOS Central database (DB) 118 so that view/plan/approve 112 can expose them. In some examples, the CIOS Central DB 118 can be a DB of flocks, plans, and state. Flock information can be authoritative; while everything else may be a stale copy of data from CIOS Regional 120. CIOS Central 102 may be configured to provide any suitable portion and/or number of user interfaces (e.g., user interfaces 500-1300) for presenting any suitable data related to a flock, a release, an infrastructure component, an artifact, or the like. In some embodiments, CIOS Central 102 may present via any suitable interface data related to one or more releases. A release may include any suitable combination of tasks related to one or more infrastructure components and/or one or more code changes to one or more applications (e.g., artifacts). Some examples of the user interfaces provided by CIOS Central 102 are described below with respect to FIGS. 5-13.

In some examples, engineer 108 can perform an API call for the flock management service 110 (e.g., through the ingress proxy fleet 122) to create a list of flocks. The protocol for making such an API call can be hypertext transport protocol secure (HTTPS) or the like. Relevant access control lists (ACLs) for this operation can include a local area network (LAN) 124 or other private connection. For example, CIOS may manage/control a network-connectivity alternative to using the public Internet for connecting a customer's on-premises data center or network with CIOS (e.g., a dedicated, leased, and/or private connection). Additionally, authentication and authorization (e.g., of the engineer 108) may be performed by a reservation system portal that allows users to manage machine infrastructure (e.g., reservation service). In some instances, CIOS Central 102 can store flock metadata, plans, and state in the Central DB 118, using Java database connectivity (JDBC) or the like. In some examples, ANS 106 can be configured to notify the change monitoring service 114 when new artifacts have been published. The ANS 106 may use HTTPS, and both authentication and authorization may be handled by a mutual transport layer security service. Additionally, in some instances, the change monitoring service 114 can poll the SCVMS 104 for flock configuration changes. This polling can be performed using secure shell (SSH) or other protocols. Authentication of the change monitoring service 114 may be handled by a CIOS system account and authorization may be handled by SCVMS 104.

In some examples, the engineer 108 can use the view/plan/approve service 112 to do one or more of the following operations. The engineer 108 can plan and/or approve by calling CIOS Central 102 to generate and approve plans. The engineer 108 can view by calling CIOS Central 102 to view the status of ongoing CIOS activity world-wide. Additionally, the engineer 108 can CIOS Central 102 to view a replica of the state of CIOS-managed resources world-wide. These API calls (or the like) can be performed via the HTTPS protocol or similar protocols. Additionally, relevant ACLs can be controlled by LAN 124, and both authentication and authorization can be handled by the reservation service. In some examples, the view/plan/approve service 112 can request planning and push plan approval to all regions of CIOS Regional 120 (e.g., using HTTPS or the like). Relevant ACLs can be controlled using a security list managed by the wide area network (WAN) gateway 126. Authentication can be handled by mutual transport layer security and authorization can be handled by various identity policies. Further, the state ingester service 116 can watch CIOS Regional 120 for job status or state changes, so that CIOS can provide a central view of them upon request (e.g., also using HTTPS or the like). ACLSs for this can also be handled by the WAN gateway 126, and both authentication and authorization can be handled by mutual transport layer security services.

Figure 2:
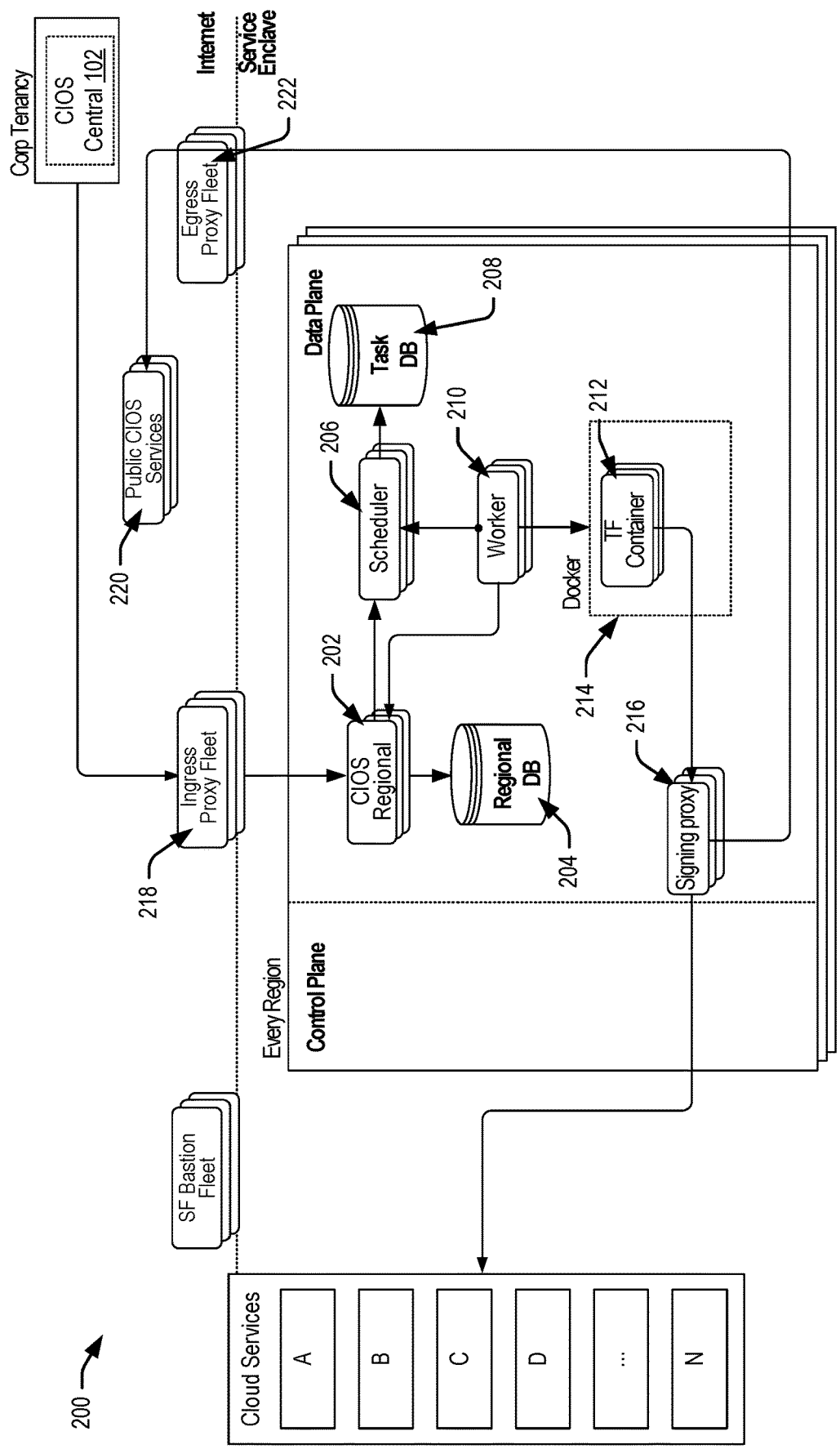
FIG. 2 is a block diagram of an architecture for implementing at least some elements of a cloud infrastructure orchestration service, according to at least one embodiment.

FIG. 2 depicts an architecture 200 for illustrating techniques for implementing at least CIOS Regional 202. In some examples, CIOS Regional 202 is where much of the work of declarative provisioning and planning, as well as approved release application can occur. In some instances, each instance of CIOS Regional 202 may have a regional fronted that can handle operations at the level of "Execution Targets." It can be configured to perform the following:

Handling all CIOS Authentication for incoming operations from CIOS Central 102.

Enforcing a rule that only one "execution" (plan/import resources/apply plan) can be ongoing for a given Execution target at a time.

Managing binary artifact storage for declarative provisioning artifacts used for input and output during declarative infrastructure provisioning execution. Examples of input are declarative infrastructure provisioning configuration files and an input state file. Typical output is a final state file.

Requesting work from and polls for results from the CIOS Executor for any given execution.

In some instances, the CIOS Frontend may be dependent on a CIOS Executor 206 (also referred to herein as a "scheduler"), which can handle the actual execution. The CIOS Executor, in some examples, operates at the level of "Execution," and it can:

Track a pool of available Worker nodes

Query incoming job requests, and assigns them to eligible workers as available

Track worker status and Execution updates for reporting to clients

Detect dead nodes via a leasing protocol, and can fail tasks assigned to dead nodes, depending on task status.

Provide facilities to cancel/kill/pause/resume Executions, and can map those onto facilities to pass cancellation/kill/resumption info on to Worker nodes.

In some instances, the CIOS Executor can depend on CIOS Workers, which can assign tasks for execution to Workers, and provide a facility for Workers to update job progress. The worker service operates at the granularity of "Task." Each worker is an agent executing Tasks assigned to that worker and reporting Task status and output. Each worker can:

Poll Executor Worker APIs for assigned work items, and take action to make the assign state match its local state:

start containers for polls task items that do not exist locally kill containers for locally running containers that have no corresponding assigned task item Report status for jobs Stage input and output for job container execution Launch and monitor declarative infrastructure provisioning containers for doing the real work of a Release for an Execution Target.

CIOS Workers may depend on CIOS Executor to poll work from and report results to the worker endpoint of the CIOS Executor. The Worker may rely on the Executor for all coordination. Additionally, the CIOS Workers may also depend on CIOS Regional 202, where the Worker services reads input from and writes output to one or more APIs that are associated with the Regional Frontend service. Examples of input are configuration and starting state files and import mappings. Examples of output are declarative provisioning process, output declarative provisioning state files, and import result states.

In some examples, CIOS Regional 202 can be a regional service for managing regional instances/deployments of CIOS. CIOS Regional 202 covers responsibility for authoritatively storing and managing plans and stat that pertains to a particular region. A Regional DB 204 may be a CIOS DB for the state and plans in the particular region. This is the authoritative copy of the region's subset of the Central DB 118 of FIG. 1. Scheduler 206 can be responsible for managing worker fleet capacity, assigning tasks to workers, and keeping track of task state. In some instances, Task DB 208 is another CIOS DB for task state. Data in this DB is mostly for operational purposes. Additionally, Worker 210 can be a fleet of java virtual machines (JVMs) that manage declarative provisioning images. These receive instructions from the Scheduler 206 and communicate results to both the Scheduler 206 and CIOS Regional 202. A CIOS container 212 can run declarative provisioning actions in its own private docker 214 container. This container does not need to contain secrets. Additionally, in some examples, a signing proxy 216 can be configured to prevent secret exfiltration via a declarative provisioning tool, in order to avoid putting secrets in the declarative provisioning Image. Instead, CIOS can perform request signing or initiate a mutual transport layer security (mTLS) service in a proxy. This also makes it easier to use FIPS-compliant crypto libraries.

In some examples, CIOS Central 102 can call CIOS Regional 202 to create plans, push approvals, watch job status (service principal), and extract declarative provisioner state (service principal). An ingress proxy 218 can be configured as the ACL and various identity policies may be used for both authentication and authorization. Alternatively, in some examples, the ingress proxy 218 may be replaced with a load balancer configured to balance the load incoming requests, plans, etc. In some instances, CIOS Regional 202 may run a declarative provisioner by asking the scheduler 206 to do so. Worker 210 can ask Scheduler 206 what it should be running, and can report status to Scheduler 206 when done. In some cases, mTLS may handle both authentication and authorization for CIOS Regional 202 and Worker 210. Additionally, when Worker 210 needs to run a declarative provisioner, it does so in docker containers by interacting with the local docker 214. Authentication for this stage may be handled by a local unix socket. A docker protocol may be used for this last step; however, HTTPS may be utilized for the previous ones.

In some embodiments, CIOS Regional 202 may be configured to provide any suitable portion and/or number of user interfaces (e.g., user interfaces 500-1300) for presenting any suitable data related to a flock, a release, an infrastructure component, an artifact, or the like. In some embodiments, CIOS Regional 202 may present via any suitable interface data related to one or more releases. A release may include any suitable combination of tasks related to one or more infrastructure components and/or one or more code changes to one or more applications (e.g., artifacts). Some examples of the user interfaces provided by CIOS Regional 202 are described below with respect to FIGS. 5-13.

In some examples, the CIOS container 212 enables a declarative provisioner to interact (via API) with the signing proxy 216, while the declarative provisioner thinks it's calling various CIOS services. The signing proxy 216 listens on one ephemeral port per calling instance of declarative provisioner, known only to that declarative provisioner. The signing proxy 216 can initiate requests signatures or mTLS, and can pass the declarative provisioner's calls through to other CIOS services within the service enclave. In some instances, the signing proxy 216 can also communicate with one or more public CIOS services 220. For example, the Signing Proxy 216 will use the internal endpoint of public services where possible. For services with no internal endpoint, it must use the egress proxy 222 to reach the external endpoint. This use of the signing proxy 216 may not be for cross-region communication; for example, an egress proxy whitelist in each region may only be for that region's public IP ranges. In some examples, Worker 210 may then persist state and logs from a declarative provisioner in CIOS Regional 202 so that they can be exfiltrated to CIOS Central 102.

Using CIOS, there are a few phases of a representative customer experience: onboarding, pre-release, world-wide release, and tactical release. For the pre-release phase, the below is an example of what happens between a new artifact being built and releasing artifacts to release one (e.g., R1). This should replace some or most of current change management processes. As relevant artifacts are built, CIOS can automatically generate releases using "the latest version of everything in the flock." A release is a specific version of the flock config with specific inputs (e.g. artifact versions, realm, region, and ad). A release contains one roll-forward plan per region and metadata describing region ordering. Each regional plan is the set of operations a declarative provisioner would take to realize the flock configuration in that region. Teams with pre-release environments can use CIOS to automatically release and test software in said environments. Teams can configure CIOS to automatically test the roll-back plan. Teams will be able to inspect and approve releases through the CIOS UI. Teams can approve some but not all of the regional plans within a release. If "the latest version of everything" yielded no suitable plans, teams can ask CIOS to generate a plan for cherry-picked artifact versions.

For the world-wide release phase, the below is an example of how a team executes tomorrow's version of today's "normal CM." Once a release is approved, CIOS pushes each approved regional plan to the respective region. CIOS acts independently within each region to apply approved plans. CIOS will only perform the set of actions explicitly described in that region's plan. Instead of "thinking independently," it will fail. CIOS UI shows teams the progress of the execution. CIOS UI prompts teams when manual approvals are required. If execution fails because of an outage in CIOS or in a downstream service, CIOS can notify the team and can prompt them for next steps (e.g., abort, retry). CIOS does perform retries, but some downstream system outages will exceed its willingness to retry. If execution fails because of service health degradation or a test failure, CIOS will assist teams with rolling the flock back to its starting state. CIOS will notify (e.g., page) teams when it initiates automatic rollback. Teams must approve the rollback plan, then CIOS will execute it.

For the tactical release phase, the below is an example of how a team can execute tomorrow's version of an "emergent CM." When generating a plan, teams may ask CIOS to target the plan at specific resources in several ways: topologically (e.g., realm, region, AD, etc.), by resource type (e.g., "only metrics configs" or "only deployment orchestration service deployments", etc.), or combinations of the above (e.g., in a disjunctive manner). Teams approve tactical releases just like world-wide releases. CIOS orchestrates them similarly. If a team needs to deploy a tactical release while there is an active a world-wide release, CIOS will stop executing the world-wide release in the targeted regions, then start executing the tactical release.

In some examples, a declarative provisioner's state (e.g., traditionally a file) is an authoritative record of the set of resources managed by the declarative provisioner. It contains the mapping between the logical identifier of each resource from the configuration file and the actual identifier of the resource. When the declarative provisioner is creating a resource, certain kinds of failure can prevent the actual identifier from being recorded in the state. When this happens, the actual identifier is lost to the declarative provisioner. These can be called "orphaned resources."

For most resources, orphans represent waste—the declarative provisioner launched (for example) an instance that it forgot about, but will launch another instance instead the next time it is run. For resources with uniqueness constraints or client-supplied identifiers, orphans prevent the declarative provisioner from making forward progress. For example, if the declarative provisioner creates a user 'nglass' and a failure orphans it, the next run of the declarative provisioner will attempt to create 'nglass' and fail because a user with that username already exists. In some cases, orphans are only a problem when adding new resources to the state. In some instances, the declarative provisioner's refresh behavior may naturally recover from failures to record updates and deletions.

CIOS needs to be robust in the event of downstream service outages or outages of CIOS itself. Because CIOS can leverage a declarative provisioner to apply changes, this means there should be robustness around running the declarative provisioner and maintaining the declarative provisioner state. The declarative provisioner providers perform 'small scale' retries-enough to avoid outages lasting for small numbers of minutes. For example, a cloud provider will retry for up to 30 minutes. Downstream system outages lasting longer than 30 minutes will cause the declarative provisioner to fail. When the declarative provisioner fails, it records all changes it successfully made in the state, then exits. To retry, CIOS must re-execute the declarative provisioner. Re-executing the declarative provisioner also allows CIOS to retry in the event of a failure in CIOS itself. In some instances, CIOS can run the following operations in a loop:

Refresh—the declarative provisioner calls GET APIs to retrieve a fresh snapshot of every resource described in its state.

Plan—the declarative provisioner generates a plan (a concrete set of API calls) that will realize the desired state, given the recently-refreshed current state.

Apply—the declarative provisioner executes the set of steps in the plan.

CIOS may always run all three of these steps when executing the declarative provisioner. The refresh operation helps recover from any updates or deletions that weren't recorded. CIOS inspects the result of the plan operation and compares it to the approved release plan. If the newly generated plan contains operations that were not in the approved release plan, CIOS may fail and may notify the service team.

Figure 3:
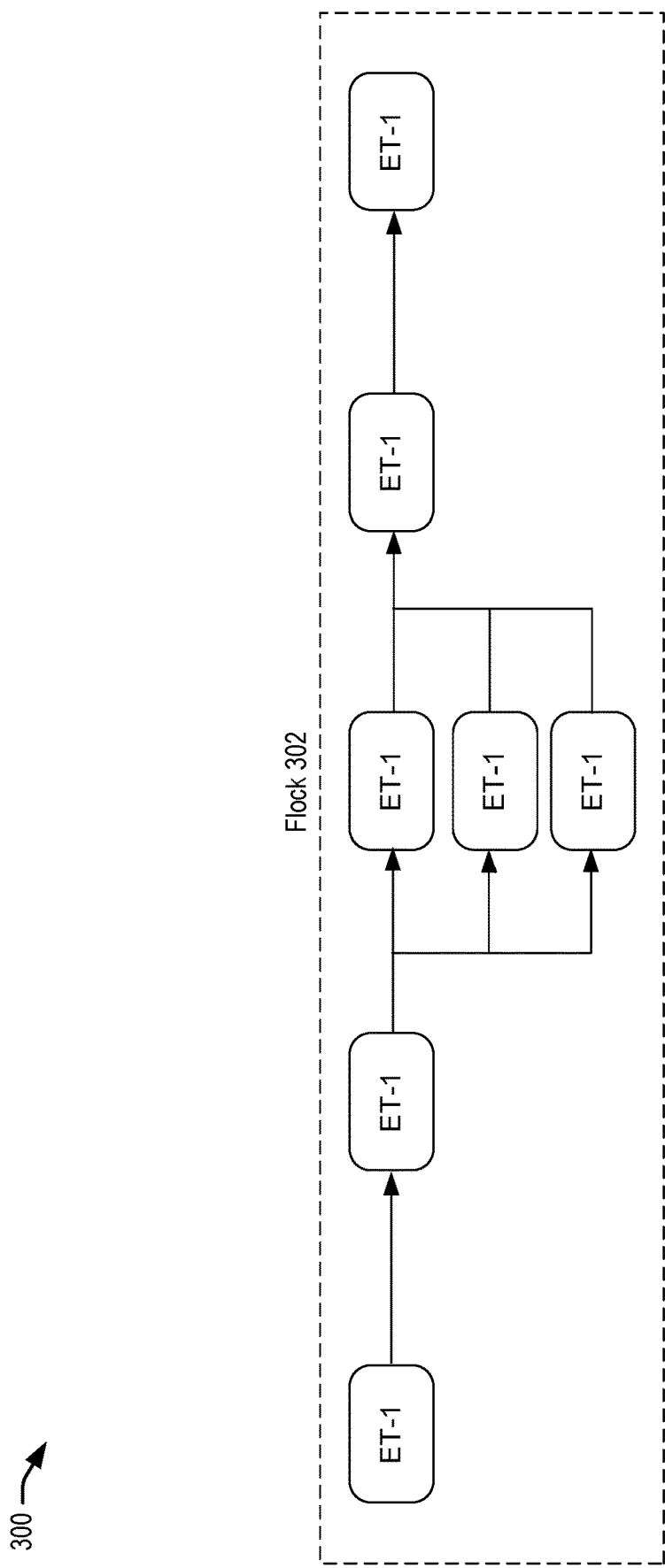
FIG. 3 is a flow diagram for illustrating an example flock, according to at least one embodiment.

FIG. 3 depicts a directed acyclic graph (DAG) 300 for illustrating an example flock 302. The progression of code/config from check-in to production, for a single flock config in CIOS, can be described all the way from the first testing deployment to the last prod deployment. Internally, CIOS calls each element in the progression an Execution Target (ET). CIOS executes ETs based on the DAG 200 defined in the flock config. Each ET (e.g., ET-1, ET-2, ET-3, ET-4, ET-5, ET-6, and ET-7) is, roughly, one copy of the service described by the flock config.

Figure 4:
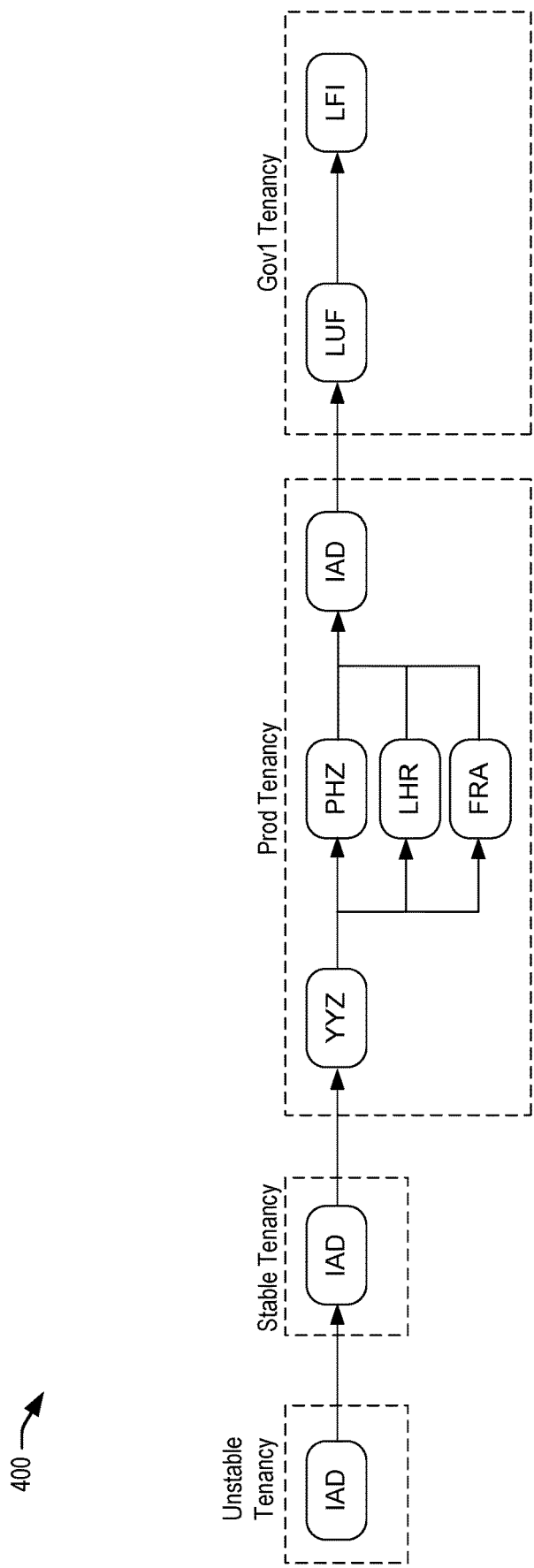
FIG. 4 is a flow diagram for illustrating an example flock, according to at least one embodiment.

FIG. 4 depicts a DAG 400 for illustrating and example flock 402. In the flock config, CIOS is very opinionated about how teams express this progression-they must model it using cloud infrastructure tenancies and regions. Teams should not model progression using realms. CIOS allows teams to use many tenancies within a realm and many regions within a tenancy. DAG 400 illustrates a version of DAG 300 from FIG. 3, expressed with tenancies and regions. This example is for an overlay service, where pre-prod ETs are in a prod region. A service enclave service would have the unstable and stable tenancies in release one. In DAG 400, IAD is a regional airport code for Dulles airport in Washington, D.C., YYZ is a regional airport code for Toronto, Ontario, PHX, LHR, and FRA, are regional airport codes for Phoenix, London, and Frankfurt, respectively, and LUF and LFI are for two different air force bases.

In one embodiment, CIOS and/or other techniques described herein are an improvement on each of Terraform (a declarative provisioning tool), Tanden (a code generation tool), and the Oracle Deployment Orchestrator (ODO). Additionally, in some examples, CIOS and/or other techniques described herein can be implemented using at least portions of the Terraform, Tanden, and ODO tools.

Figure 5:
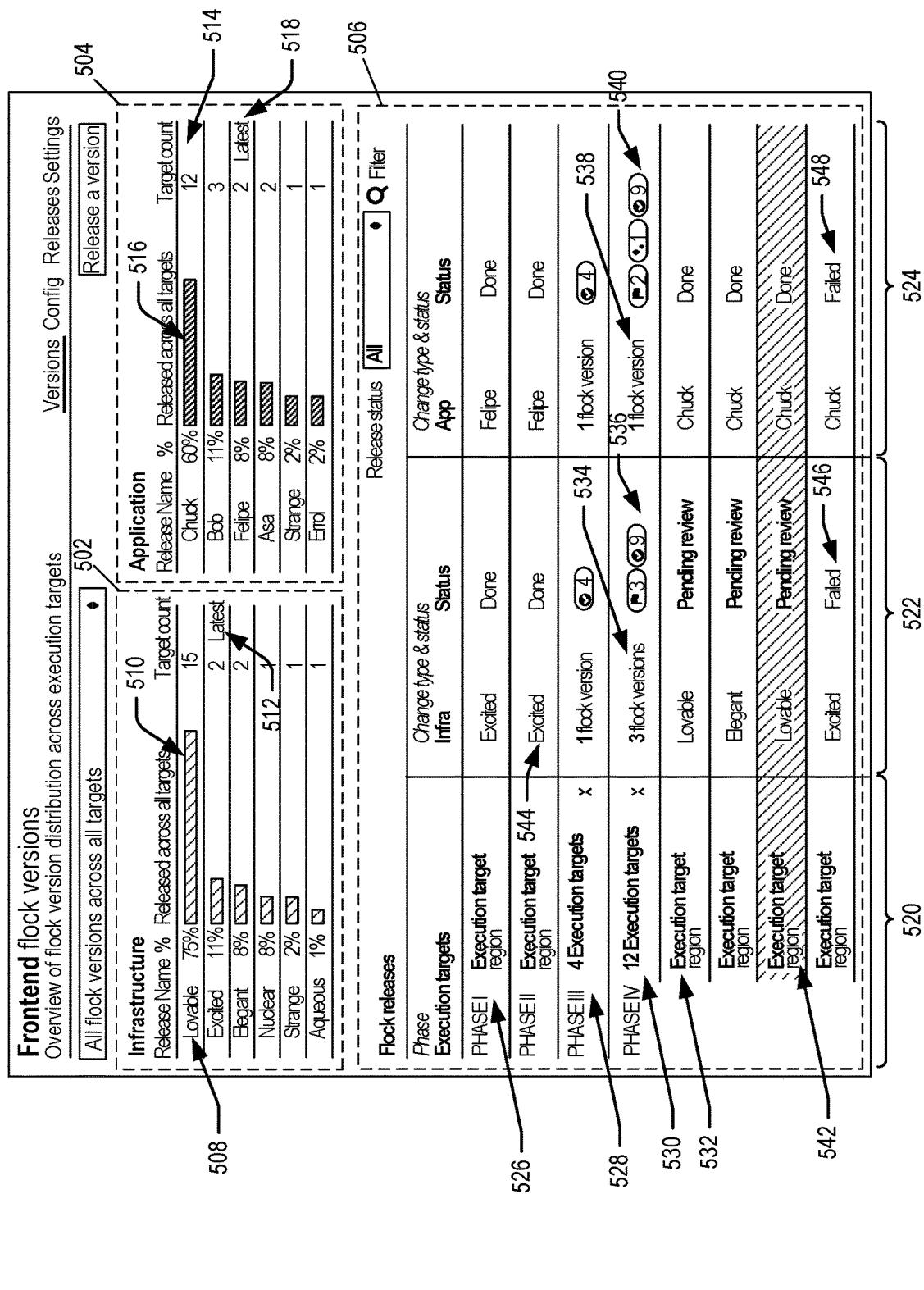
FIG. 5 is a schematic diagram illustrating an example user interface, according to at least one embodiment.

FIG. 5 depicts a schematic diagram of an example user interface (UI) 500, according to at least one embodiment. The UI 500 can include any suitable combination of an infrastructure area 502, an application area 504, and a task area 506. The UI 500 can include the infrastructure area 502, the application area 504, and the task area 506 as depicted and arranged in FIG. 5, or these areas may be differently arranged within the UI 500.

The infrastructure area 502 can be located at any suitable location of the UI 500. As depicted in FIG. 5, the infrastructure area 502 is positioned in the upper left corner of the UI 500. The infrastructure area 502 can include infrastructure release data (e.g., a release name, a number of execution targets to which the infrastructure components of the release are to be provisioned, one or more indicators of progress associated with performing the release, an indicator of the latest infrastructure release, and the like) corresponding to any suitable number of infrastructure releases. As depicted, the infrastructure area 502 presents infrastructure release data corresponding to six releases entitled "Lovable," "Excited," "Elegant," "Nuclear," "Strange," and "Aqueous." Entry 508 presents infrastructure release data corresponding to the release "Lovable" and includes a percentage (e.g., 75%) and a progress bar 510, each indicating that the release has been performed on 75% of the flock. It should be appreciated that the percentage and the progress bar 510 are example user interface elements for depicting release progress, but that any suitable user interface element may be utilized to represent such progress (e.g., visually, textually, etc.). By way of example, the progress of a corresponding infrastructure release may additionally, or alternatively, be represented by a number, a chart, or any other suitable user interface element for displaying progress. In some embodiments, a particular infrastructure release may be identified as a latest release using label 512 or another suitable user interface element including an icon, a checkmark, or the like. As depicted in FIG. 5, entry 508 includes a target count indicating a number of execution targets (e.g., 15) to which infrastructure components corresponding to the Lovable release are provisioned. It is contemplated that the infrastructure release data provided in each entry of the infrastructure area 502 may be differently arranged and may include more or less attributes of the infrastructure release data corresponding to each release than the number of attributes depicted in FIG. 5.

In some embodiments, the UI 500 may include the application area 504. The application area 504 can be located at any suitable location of the UI 500. In the example depicted in FIG. 5, the application area 504 is positioned in the upper right corner of the UI 500. The application area 504 can include application release data (e.g., an application release name, a number of execution targets to which software artifacts of the release are to be deployed, one or more indicators of progress associated with performing the release (e.g., deploying the software artifacts), an indicator of the latest application release, and the like) corresponding to any suitable number of application releases. As depicted, the application area 504 presents application release data corresponding to six application releases entitled "Chuck," "Bob," "Felipe," "Asa," "Strange," and "Errol." Entry 514 presents application release data corresponding to the application release "Chuck" and includes a percentage (e.g., 60%) and a progress bar 516 indicating that the release has been performed on 60% of the flock. It should be appreciated that the percentage and the progress bar 516 are example user interface elements for depicting application release progress, but that any suitable user interface element may be utilized to represent such progress (e.g., visually, textually, etc.). By way of example, the progress of a corresponding application release may additionally, or alternatively be represented by a number, a chart, or any other suitable user interface element for displaying progress. In some embodiments, a particular infrastructure release may be identified as a latest release using label 518 or another suitable user interface element including an icon, a checkmark, or the like. As depicted in FIG. 5, entry 514 includes a target count indicating a number of execution targets (e.g., 12) to which artifacts (e.g., application code) corresponding to the Chuck release are provisioned. It is contemplated that the application release data provided in each entry of the application area 504 may be differently arranged and may include more or fewer attributes of the application release data corresponding to each release.

In some embodiments, the UI 500 may include the task area 506. The task area 506 can be located at any suitable location of the UI 500. In the example depicted in FIG. 5, is positioned toward the lower half of the UI 500. The task area 506 can include target release information corresponding to each execution target of a flock. Each execution target of the examples provided herein may correspond to a region. A region in the examples herein may comprise at least one physical location. The target release information can include an identifier for an infrastructure release, a status (e.g., a visual representation of status) corresponding to the progress of provisioning to the execution target the infrastructure components of the infrastructure release, an identifier for an application release, and a status (e.g., a visual representation of status) indicating the progress of deploying artifacts (e.g., application code) corresponding to that application release. The task area 506 can include any suitable number and combination of columns such as an execution target column 520, infrastructure change column 522, and/or application change column 524. The execution target column 520 can be organized by phases, where phases can indicate an order by which releases (e.g., including provisioning a set of infrastructure components and/or deploying a set of software artifacts) are to be performed across execution targets. In the UI 500, there are four phases depicted: phase I, phase II, phase III, and phase IV. In some embodiments, phase I must be completed before the deployment enters phase II, phase II before phase III, and so on. As depicted phases I and II include one execution target each, phase III includes 4 execution targets, and phase IV includes 12 execution targets. The execution targets can be applied in parallel.

Each row of the task area 506 may correspond to a phase and/or an execution target. By way of example, entry 526 may correspond to a phase (e.g., phase I) and a single execution target of that phase. Entry 528 may correspond to phase III. Entry 530 may correspond to phase IV. By default, the entries corresponding to the execution targets of a phase may be hidden. Selection of an entry corresponding to a phase may cause rows corresponding to corresponding execution targets of that phase to appear. By way of example, entry 532 may be initially hidden and only entry 530 may be displayed. In some embodiments, once entry 530 is selected, entry 532 may be presented. The entry 532 depicts a particular execution target/region of phase IV to which an infrastructure release (e.g., "Lovable") and an application release (e.g., "Chuck") correspond.

The infrastructure change column 522 can include a name of an infrastructure release and a status of the infrastructure release for each phase or execution target. In some embodiments, a phase which includes more than one execution target may correspond to one or more infrastructure and/or application releases. Thus, in some embodiments, infrastructure change column 522 may include data indicating a number of differing infrastructure releases utilized by the execution targets of a phase. By way of example, indicator 534 may be presented to indicate that there are three different infrastructure releases to be released to the execution targets of phase IV. Status indicators 536 may also be presented within infrastructure change column to indicate a status for each infrastructure release to each execution target of the phase. The status indicators 536 may individually indicate that releases to one or more execution targets has encountered an error, is in progress, or has completed. Similarly, application change column 524 can include indicator 538 to indicate one application release is to be utilized for every execution target of phase IV and status indicator 540 to indicate a status of each application release for each execution target of phase IV. For entries corresponding to a single execution target (e.g., entry 532), the infrastructure change column 522 may present the name of the infrastructure release and a status. In some embodiments, the status (e.g., "Done," "Failed," "In Progress," "Pending Review," or the like) may be presented textually as depicted in FIG. 5 or the status may be presented differently. For entries corresponding to a single execution target, the application change column 524 can similarly include a name of an application release (e.g., "Chuck") and a status of the application release (e.g., "Done," "Failed," "In Progress," "Pending Review," or the like). The statuses displayed for an application release can be the same or different from the statuses provided for an infrastructure release. In some embodiments, selecting an entry (e.g., selecting entry 542) may cause the entry to be visually modified (e.g., a background of the entry may be modified) to indicate the selection. One example modification corresponding to selection of entry 542 is depicted in FIG. 5. Selecting link 544 may navigate the user to the UI 600 of FIG. 6, although other navigation actions may provide a similar outcome.

In some embodiments, if the release fails in at least one aspect, the status of this failure may be indicated at the UI 500. By way of example, a failure of infrastructure component provisioning is indicated at 546 and a failure of a software artifact deployment is indicated at 548. In some embodiments, user input may be received (e.g., a selection of the word "Failed") at 546 and/or 548. In response to this user input, the user may be provided one or more options to perform a remedial action (e.g., reattempting the provisioning and/or deployment task corresponding to the execution target, canceling the provisioning and/or deployment task corresponding to the execution target, modifying the provisioning and/or deployment task corresponding to the execution target, and the like).

Figure 6:
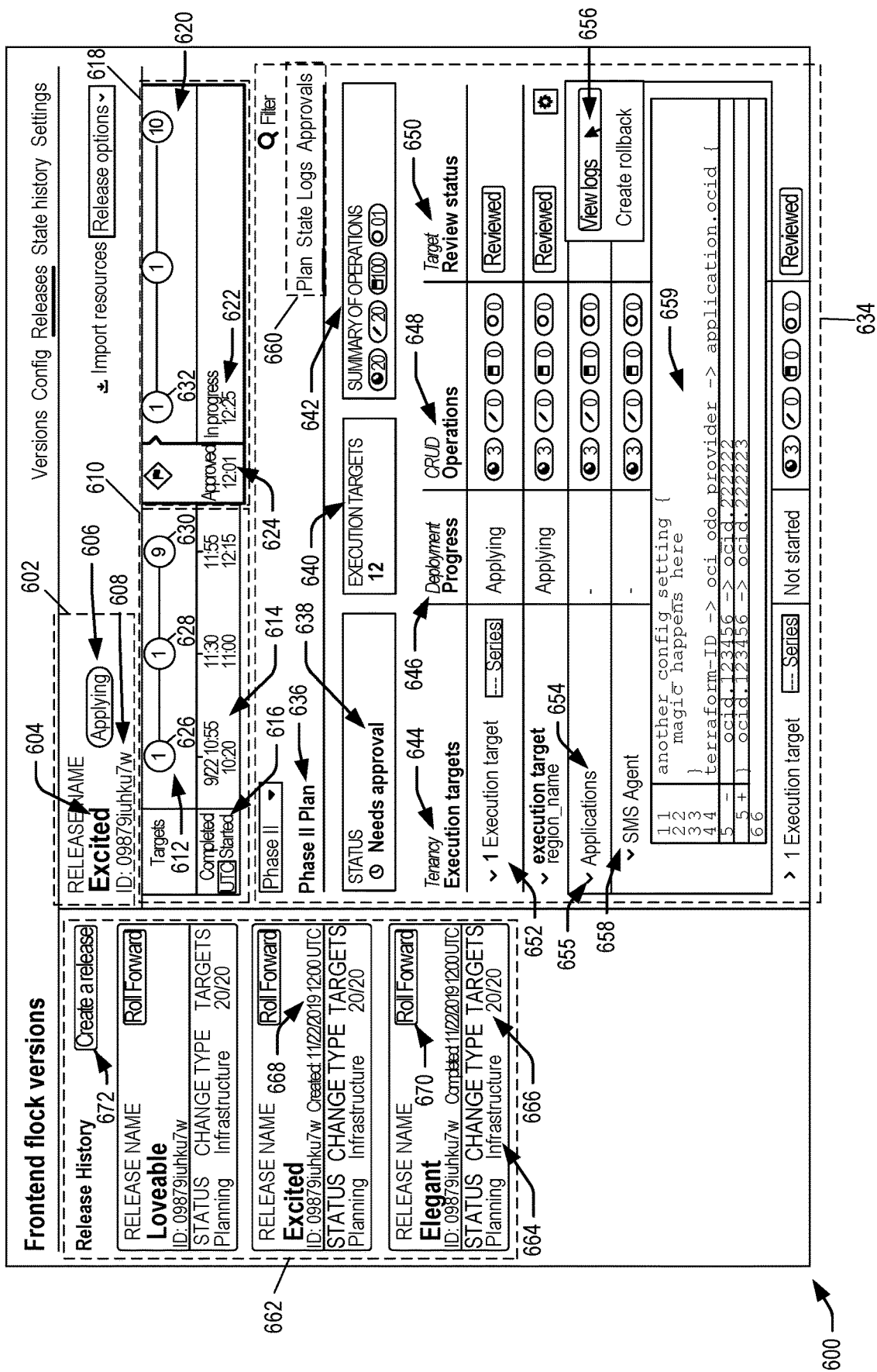
FIG. 6 is a schematic diagram illustrating an example user interface for providing information relating to a selected release, according to at least one embodiment.

FIG. 6 depicts a schematic diagram illustrating an example UI 600 for providing information relating to a selected release, according to at least one embodiment. The UI 600 may depict a user interface from which details of a release may be viewed. A release name section 602 is shown at the top of the UI 600, but the release name section 602 can be located in any suitable position on the UI 600. As illustrated, the release name section 602 may present release data associated with a particular release. By way of example, the release data associated with the release "Excited" is depicted as including a release name 604, a status 606, a release identifier 608, although more or fewer attributes of the release data may be presented. As illustrated, the release name 604 is "Excited," but the release name 604 can include any suitable alphanumeric identifier corresponding to a name of any suitable release in the desired flock. The status 606 may indicate a status (e.g. "Not Started," "Needs Approval," "Applying," "Failed," "Done," or the like) associated with the particular release. The release identifier 608 is depicted as "09879iuhku7w", but the release identifier 608 can be any suitable ID that may be unique to the relevant release.

The UI 600 can also include a status bar 610, which can include information about the status of the relevant release such as graph 612, timestamps 614, and status codes 616. Similarly, status bar 618 may include a graph 620, timestamps 622, and status codes 624. The graphs 612 and 618 may present an serial ordered list of tasks. By way of example, each node of graphs 612 and 618 may represent a set of tasks (e.g., "1" indicating a set of 1 task, "9" indicating a set of 9 tasks, and the like). If more than one task is indicated in a node, the node may be intended to refer to a set of tasks that are to be performed in parallel. Each task may correspond to a release corresponding to a particular target. The order of nodes (e.g., from left to right) may indicate a sequence by which each set of task(s) is to be performed. For example, the task associated with node 626 may be required to be completed before the task associated with node 628 commence. Similarly, the task associated with node 628 may be required to be completed before the tasks associated with node 630 commence. Each of the tasks associated with the node 630 may be performed in parallel. The timestamps 614 may present a starting date. Additionally, the timestamps 614 may present a starting time corresponding with the status code "Started," and ending time corresponding with the status code "Completed." The status code 624 may indicate that the associated tasks are approved, while the timestamp 622 may indicate a starting time corresponding to the task associated with node 632. may be labeled "In Progress," to indicate the task in currently being executed. It should be appreciated that the status codes 616 and 624 can be any suitable status code for tracking the status of the relevant release (e.g. "Approved," "In Progress," "Failed," "Needs Approval," and the like).

In some embodiments, status bars may be utilized to depict a phase order. By way of example, status bar 610 may correspond to a particular phase such as phase 1, while status bar 618 may correspond to a different phase such as phase 2. As described above, phases may be used to describe an order by which phases are to be completed. As depicted, the 11 phase 1 tasks illustrated in status bar 610 may be required to complete before the 12 phase 2 tasks associated with status bar 618 commence. It should be appreciated that additional phases may be utilized other than just two. When presenting the information corresponding to a phase or multiple phases is too wide to display given the current window size, it should be appreciated that the status bar 610 may be horizontally scrollable such that the user can scroll through the various phases to view their corresponding status. In some embodiments, the status bar 610 utilizes "smart scrolling" so that if a user is utilizing an input device with only vertical scrolling capabilities (e.g., a mouse), that user may still scroll horizontally. By way of example, a user may physically scroll downward using the input device and the status bar 610 will scroll to the right. If the user physically scrolls upward using the input device, the status bar 610 may scroll to the left. The filters enable the user to focus on impactful changes so that the user is less likely to be distracted by operational noise and miss impactful changes or errors.

A phase plan section 634 can also be included in the UI 600, and as illustrated, the phase plan section 634 is at the bottom of the UI 600, although it can be different placed in UI 600. The phase plan section 634 can include information relevant to the desired phase (e.g., phase 2 corresponding to status bar 618). As illustrated in the UI 600, the phase plan section 634 indicates a phase title 636, a phase status 638, a number of execution targets 640, a summary of operations 642, a tenancy column 644, a deployment progress column 646, a Create, Read, Update, Delete (CRUD) operations column 648, and a target review status column 650. The phase title 636 can include a name of the chosen phase of the release depicted in the UI 600. The name may include any suitable alphanumeric identifier of any suitable length. In some embodiments, the phase status 622 can be a status of the chosen phase of the release. As illustrated in the UI 600, the phase title 636 is "Phase II," and the phase status 638 is depicted as "Needs Approval." The phase status 638 can be any suitable status (e.g. "Needs Approval," "In Progress," "Failed," "Done," or the like) for the chosen phase of the release. The number of execution targets 640, which is depicted in the UI 600 as "12," can indicate any number of execution targets to which the release can be deployed. The summary of operations 642 can indicate the number of create, revise, update, and delete operations planned for that phase. As illustrated in the UI 600, the summary of operations 642 includes four different operations (listed from left to right): create, update, delete, and read (e.g., no change). As depicted in FIG. 6, there are 20 create operations, 20 update operations, 100 delete operations, and one no-change operation. The UI 600 can include any suitable number or combination of operations in the summary of operations 642. Summary of operations 642 may include four buttons corresponding to create, revise, update, and delete. These buttons may each be utilized as a toggle to filter a corresponding set of operations from the phase plan section 634. For example, if the "create" button is selected, all create operations may be filtered from the phase plan section 634. If the create button is selected once more, the create operations may be unfiltered and reappear within phase plan section 634. By default, the buttons may be untoggled (e.g., unselected) such that no operations are filtered, although any suitable default behavior may be utilized.

It should be appreciated that although FIG. 6 depicts changes falling under a particular execution target, in some embodiments, similar changes may be grouped together and an execution target with which each change relates may be displayed. Thus, the phase plan corresponding to FIG. 6 may be pivoted in two ways: execution targets to changes (as depicted) or changes to execution targets.

The tenancy column 644 can be located in any suitable position on the UI 600, and the tenancy column 644 can include a list of execution targets tasks including an entry corresponding to a particular set of tasks (e.g., entry 652) corresponding to node 632 of Phase II, and a list of applications 654 that are scheduled to be created, modified, or deleted during performance of those tasks. To display the list of applications 654, the user may select the option 655 to expand the list to indicate the applications (e.g., SMS Agent) included in the release. As illustrated in the UI 600, the only application currently presented is an "SMS Agent" 658. The UI 700 may depict a modification to be made to a configuration file of SMS agent at 659. In some embodiments, the computing system providing UI 600 may identify a previous configuration of a software artifact (e.g., the SMS agent), identify a new configuration of the software artifact to be deployed, and provide an indication of a change from the previous configuration to the new configuration of the software artifact (e.g., as depicted at 659). As depicted, the modification may include deleting line 5 (indicated by 5−) and adding new line 5 (indicated by 5+). In some embodiments, a "modification" (also referred to as an update) may include both a deletion and a creation). The creations/deletions of an update may be indicated as update operations and not as creations/deletions within the CRUD operations column 648. The list of applications 654 can also include any other suitable application for the selected release.

The deployment progress column 646 can display the status of the release at the relevant execution target. As illustrated in the UI 600, the status of the execution target for the depicted release is "Applying", but any suitable status can be displayed (e.g. "Applying," "Needs Approval," "Not Started," "Done," "Failed," or the like). The CRUD operations column 648 can include information about operations to be performed for the relevant target. The operations can include create commands, update commands, delete commands, or no-change commands, and the operations can be applied to each execution target, each application, or any suitable software and/or hardware component. The target review status column 650 may include information on whether or not the operations on each entity have been reviewed. As illustrated in the UI 600, the target review status is shown as "Reviewed," but the target review status can be any status suitable for tracking operations in the relevant release.

The phase plan section 634 can also include a set of selection options (e.g., selection options 660), which can include option for "Plan," "State," "Logs," "Approvals," or the like. The UI 600 and corresponding data is intended to be provided when the "Plan" option is selected.

A release history section 662 can also be located on the UI 600. As illustrated in the UI 600, the release history section 662 is located on the left portion of the UI 600, but the release history section 662 can be located in any suitable position on the UI 600. The release history section 662 can include information regarding various releases within the relevant flock. As depicted in the UI 600, there are three releases presented: "Loveable," "Excited," and "Elegant," although any suitable number of releases may be displayed in the release history section 662. Selecting any one of the releases from release history section 662 may present the corresponding data associated with that release for each of the UI elements 602-660 discussed above. In some embodiments, the release history section 662 may also include a change type indicator 664 (e.g., "Infrastructure," "Application," etc.), a number of targets indicator 666, a release timestamp 668, a roll forward option 670, and a create a new release option 672. The number of targets 666 may indicate how many execution targets to which a specific release is intended to be provisioned. The number of targets 666 can be indicated for each specific release and include any suitable number of targets for the relevant release. The release timestamp 668 can include a time when the chosen release was created or provisioning was completed along with a status indicator (e.g. "Created," "Completed," and the like). The release timestamp 668 can be located in any suitable location on the relevant release, or the release timestamp 668 can be absent from any specific release. The roll forward option 672 enables a use to re-deploy a configuration that was previously rolled back. The create a new release option 656 can enable a user to create a new release for the chosen flock.

In some embodiments, the user may right click his mouse to cause option 656 to appear. Option 656 may appear in the general vicinity of the user's mouse cursor. Selecting option 656 may navigate the user to UI 800 of FIG. 8 discussed further below.

It should be appreciated that the user may be provided the ability to scroll upward or downward within phase plan section 634 to view various portions of the data related to the particular phase selected. In some embodiments, the status bar of the selected phase (e.g., status bar 620) may be highlighted and/or enlarged indicating that its corresponding phase is selected and that the information in phase plan section 634 corresponds to the selected phase.

Figure 7:
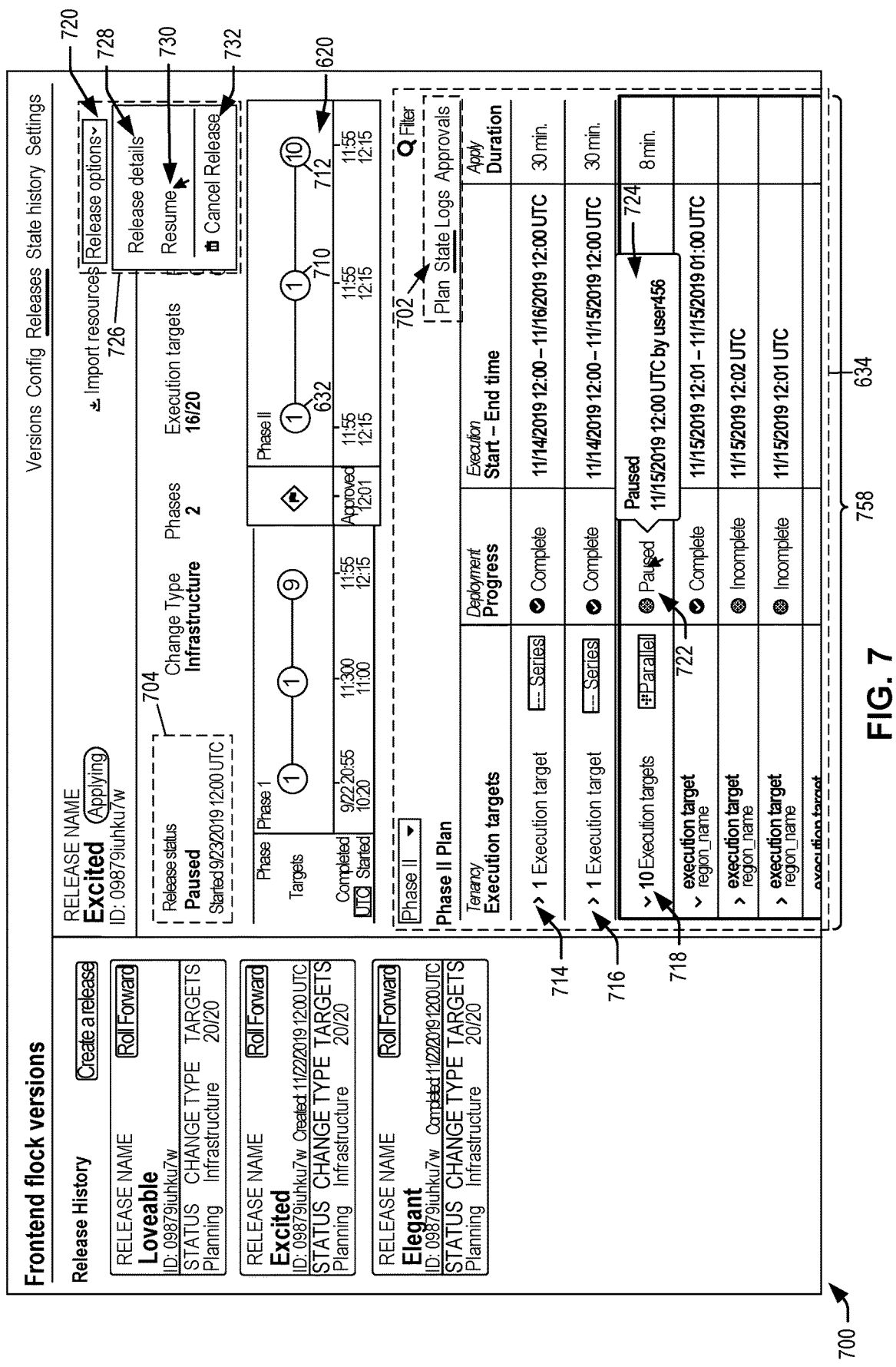
FIG. 7 is a schematic diagram illustrating an example user interface for viewing the state of a release, according to at least one embodiment.

FIG. 7 is a schematic diagram illustrating an example user interface (e.g., UI 700) for viewing the state of a release, according to at least one embodiment.

A release status section 704 can be located on the UI 700 at any suitable location. As illustrate in the UI 700, the release status section 704 is at the top of the UI 700. The release status section 704 can any suitable information relating to the release including a status of the release (e.g. "Applying," "Paused," "Done," "Failed," and the like), and a timestamp which can include a time when the relevant release (e.g., the release corresponding to the release information depicted in FIG. 7) was started, completed, paused, and the like. The release status section 704 can include any other suitable information for tracking the status of the relevant release.

In at least one embodiment, UI 700 can include the phase plan section 706. In some embodiments, the UI 700, including the phase plan section 706 may be presented in response to selection of the "State" option 702 of the selection options 660 of FIG. 6. Selecting the "State" option 702 can display information about the state of the relevant release or any other suitable information related to the status of the relevant release.

In some embodiments, the phase plan section 706 can list sets of execution targets corresponding to a phase (e.g., phase II as discussed above in connection with FIG. 6). As depicted in FIG. 6, and similarly in FIG. 7, a phase may be associated with a graph 620 including nodes 632, 710, and 712. Each node may correspond with a set of tasks of that phase. By way of example, execution target task sets 714, 716, and 718 may be listed. Execution target task set 714 may correspond to node 632, execution target task set 716 may corresponding to node 710, and execution target task set 718 may correspond to node 712. As illustrated in the UI 700, execution target task set 718 has been selected which includes ten execution targets (e.g., as indicated at both node 712 and execution target task set 718). Upon selecting the execution target task set 718, the corresponding ten execution tasks may be presented as individual rows under the execution target task set 718. As depicted in FIG. 7, each task may correspond to a particular execution target to which the release is to be provisioned.

In some embodiments, release options menu 720 may be provided. Upon selecting release options menu 720, a number of menu options may be provided (e.g., pause a release (not depicted), release details, resume, cancel release, etc.). In some embodiments, a release may be paused through selection of the release options menu 720, followed by selection of an option to pause the release. The view of UI 700 is intended to depict the state of the UI 700 after the release has been paused. In some embodiments, the paused state may be depicted at field 722. If the user were to hover over field 722, status information regarding the paused state may be displayed as depicted at 724. The information provided at 724 can include any suitable information about the state of a particular phase corresponding to a particular release.

After pausing the release, the user may again select the release options menu 710 to display a release details option 728, a resume option 730, and a cancel release option 732. The release details option 728, when selected, can display any suitable information about the relevant release (e.g., a release number). The resume option 712, when selected, can start the relevant release deployment from where it was paused. The cancel release option 714, when selected, can cancel the relevant release and remove the canceled release from the flock.

It should be appreciated that the user may be provided the ability to scroll upward or downward within phase plan section 634 to view various portions of the data related to the particular phase selected.

Figure 8:
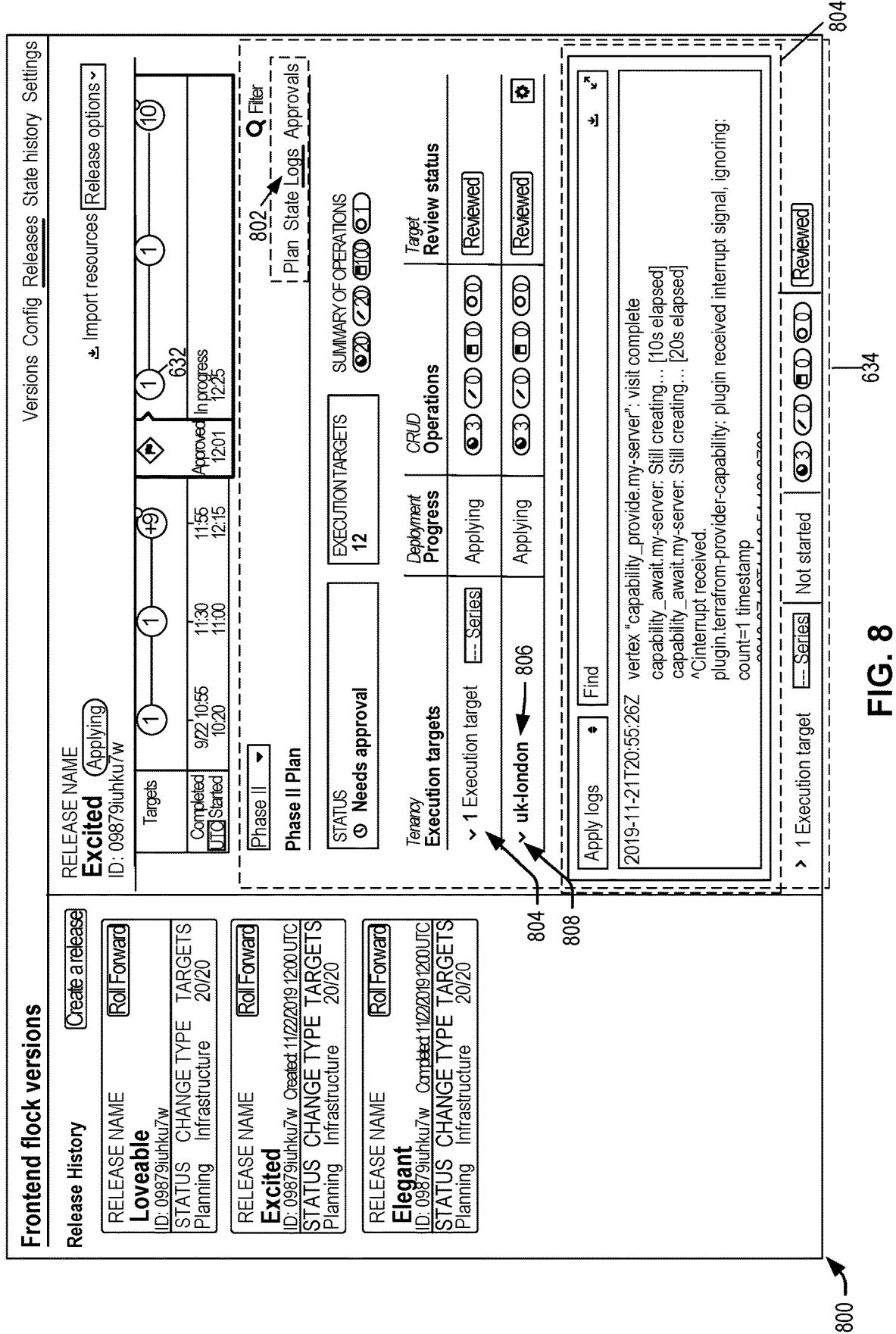
FIG. 8 is a schematic diagram illustrating an example user interface for viewing the state of a release, according to at least one embodiment.

FIG. 8 is a schematic diagram illustrating an example user interface (e.g., UI 800) for viewing the logs associated with a release, according to at least one embodiment. In some embodiments, the UI 800, including the phase plan section 634 may be presented in response to selection of the "Logs" option 802 of the selection options 660 of FIG. 6. Selecting the "Logs" option 802 can display information about the logs and/or source code of an already selected execution target or provide user interface options to access information about the logs and/or source code of any suitable execution target corresponding to the selected phase (or a subsequently selected phase).

The UI 800 can include the phase plan section 634 of FIG. 6. Execution task set 804 may be selected to display one or more tasks of the execution task set 804. Execution task set 804 may correspond to the node 632 described above in connection to FIG. 6 and depicted once again in FIG. 8. In some embodiments, upon selecting the execution task set 804 (or at any suitable time) a task 806 corresponding to providing the release at a particular execution target (e.g., uk-london) may be displayed. In some embodiments, the user may expand the task 806 (e.g., by selecting the option 808) to view one or more logs corresponding to that execution target. Selecting the "

Figure 9:
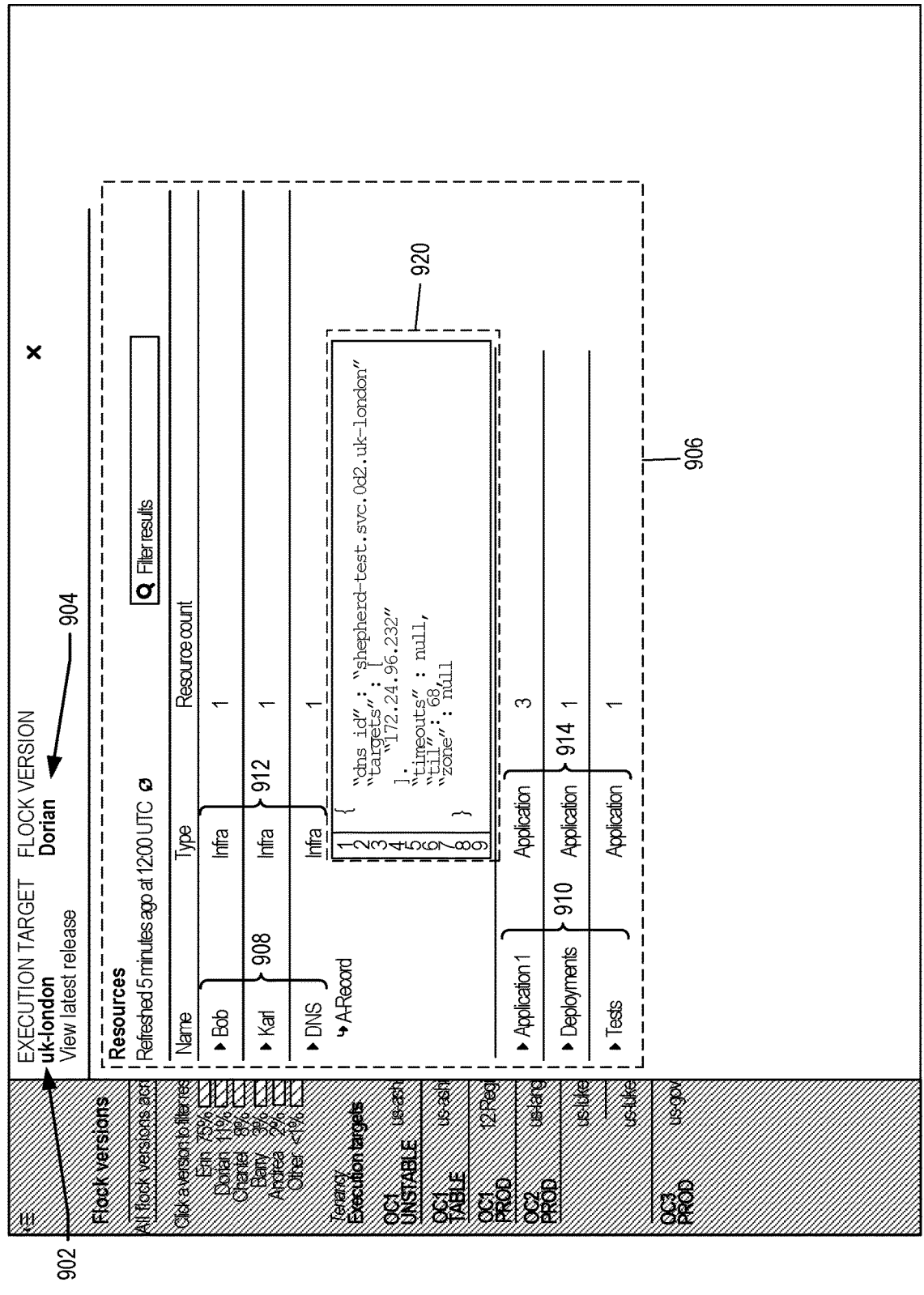
FIG. 9 is a schematic diagram illustrating an example user interface that depicts execution target resources of a selected execution target, according to at least one embodiment.

FIG. 9 depicts an example UI 900 that depicts execution target resources of a selected execution target (e.g., the execution target corresponding to the execution target task 806 from FIG. 8), according to at least one embodiment. The UI 900 can be displayed by clicking on name of the execution target task 806 depicted in FIG. 8 or by any other suitable method, and the UI 900 can be updated with information about the execution target corresponding to the execution target task 806 by periodic or forced refreshing of the UI 900. The UI 900 can include a name of the execution target 902 and a version of the flock 904. The name 902 and the version 904 can be located on the UI 900 in any suitable location, but as illustrated in FIG. 9, are located at the top of the UI 900.

The UI 900 can also include a resource section 906. In some embodiments, the resource section 906 can indicate any suitable number of infrastructure and/or software application components associated with a particular execution target. By way of example, and the resource section 906 can include various resources such as infrastructure components "Bob," "Carl," "DNS," as indicated at 908 and software artifacts (e.g., application code) such as "Application 1," "Application 2," and "Tests" as indicated at 910. Each resource may indicate whether the resource is an infrastructure component (as depicted at 910) or an application (as depicted at 912). As depicted at 912 and likewise at 914, each resource can have accompanying information such as the resource type (e.g. "Infra," "Application," and the like) and the resource count, which can be any number suitable to describe how many of each resource exists within the selected execution target. When selected, a resource can display a configuration relating to the selected resource (e.g., DNS) as in the box 916, as well as any other suitable information relating to the selected resource. It should be appreciated that, as depicted, the UI 900 may be presented as a dialog box or another suitable popup window that may be overlaid over any suitable interface (e.g., the UI 500-800 of FIGS. 5-8).

Figure 10:
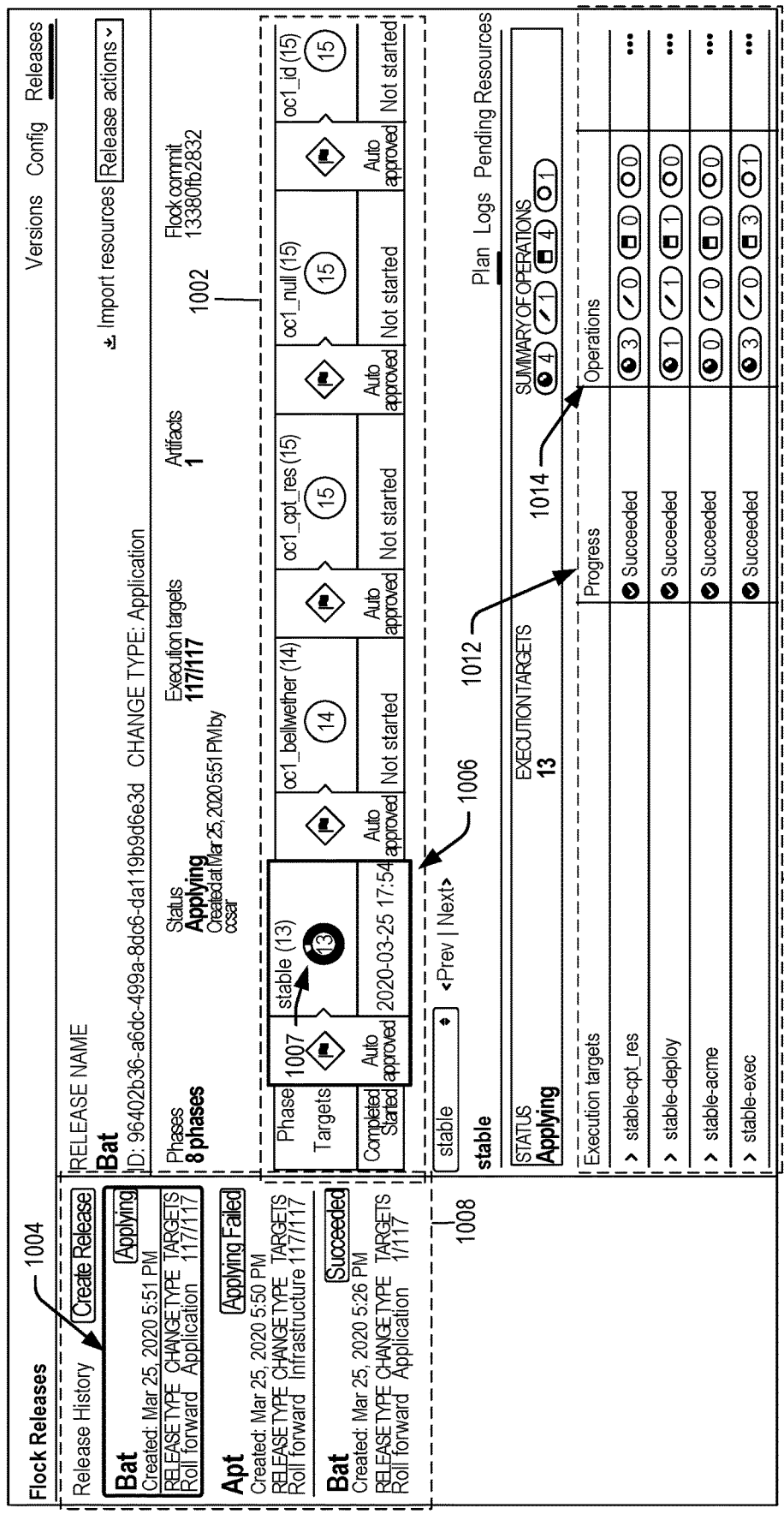
FIG. 10 is a schematic diagram illustrating an example user interface for presenting information about a selected phase of a selected release, according to at least one embodiment.

FIG. 10 is a schematic diagram illustrating an example user interface (e.g., UI 1000) for presenting information about a selected phase of a selected release, according to at least one embodiment. The UI 1000 can include a progress bar 1002, which can include all phases of the selected release 1004 or any suitable subset of the phases. While illustrated at the top of the UI 1000, the progress bar 1002 can be located in any suitable location on the UI 1000. The progress bar 1002 can also include various information about each phase of the selected release 1004 including, but not limited to, phase name, number of execution targets, timestamps, approval status, phase status, and any other suitable information relevant to each phase of the selected release 1004. The selected phase 1006 as illustrated in the UI is "stable(13)," but any phase in the progress bar 1002 can be selected to show relevant information about the respective phase. The selected phase 1006 can also include a circular progress bar 1007, which can visually track the progress of the collective task(s) of the selected phase 1006. Said another way, the circular progress bar 1007 may present a visual representation of progress corresponding to the phase. In some embodiments, the circular progress bar 1007 may pulsate to indicate the tasks of the selected phase 1002 are currently in progress. In some embodiments, the circular progress bar 107 can include one or more green portions (e.g., indicators) and/or one or more red portions (e.g., indicators) and/or one or more white portions (e.g., indicators), each portion corresponding to a task of the set of tasks associated with the phase. In some embodiments, a green portion (e.g., a green indicator) of the circular progress bar 1007 can represent a completed task of the selected phase 1006, and a red portion (e.g., a red indicator) of the progress bar 1007 can represent a failed task of the selected phase 1006. A white portion (e.g., a white indicator) of the progress bar 1007 can represent a task of the selected phase 1006 that has not yet failed nor completed. The UI 1000 can also include the release history section 1108 (e.g., the release history section 646 of FIG. 6), and the selected release 1004 can be located in the release history section 1008 of the UI 1000.

Each execution task of the phase (e.g., corresponding to an execution target to which the release will be deployed) may be presented in the status area 1010. In some embodiments, the tasks can be displayed in the order in which they will be executed and/or in any suitable location on the UI 1000. As illustrated, the list of execution tasks is located at the bottom of the UI 1000. The list of tasks presented in area 1010 can include a progress column 1012, an operations column 1014, and any other suitable information relating to the listed tasks. The progress column 1012 can display progress statuses of each execution target in the list of execution targets 1008 (e.g. "Succeeded," "Failed," "Applying," and the like). The operations column 1014 can include information about what operations may be executed with respect to each task of the selected phase 1006 (e.g., each task corresponding to an execution target of the selected phase 1006).

Figure 11:
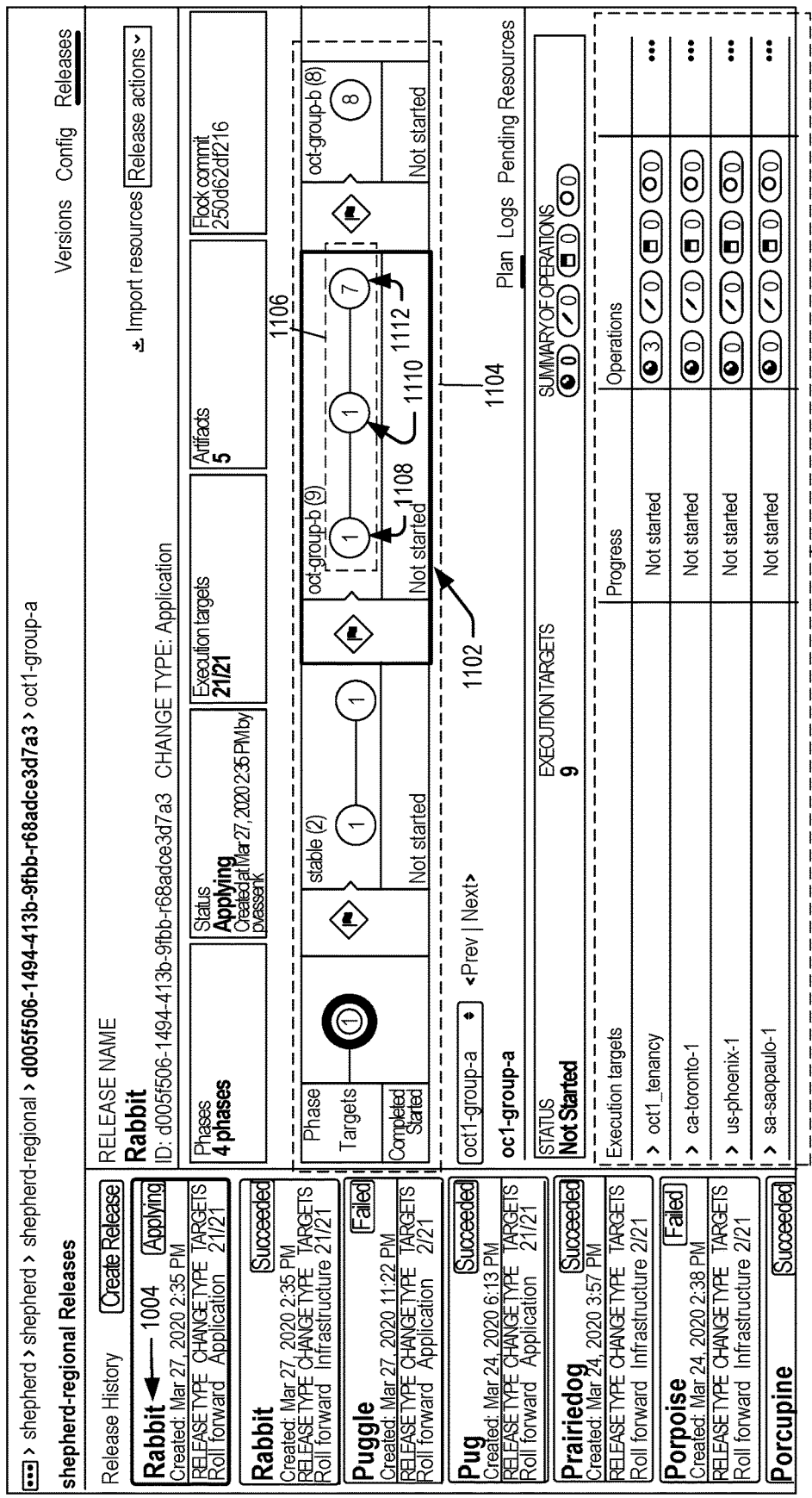
FIG. 11 is a schematic diagram illustrating an example user interface that depicts an execution graph for illustrating an execution order for a set of execution tasks, according to at least one embodiment.

FIG. 11 is a schematic diagram illustrating an example user interface 1100 that depicts an execution graph for illustrating an execution order for a set of execution tasks, according to at least one embodiment. The selected phase 1102 can be selected from the progress bar 1104 (e.g., an example of the progress bar 1006 of FIG. 10). A section corresponding to the selected phase 1102 can include a graph 1106. The graph 1106 may depict an order in which execution tasks corresponding to execution targets can be executed. As illustrated in the UI 1100, the graph 1106 may contain node 1108, 1110, and 1112. Node 1108 may be associated with one execution task corresponding to one execution target. Node 1110 may be associated with one execution task corresponding to one execution target. Node 1112 may be associated with seven execution tasks corresponding to seven execution targets. Graph 1106 depicts a sequence of execution between each group of tasks corresponding to the nodes 1108, 1110, and 1112. For example, the task associated with node 1108 may be required to be completed before the task associated with node 1110 may commence. Likewise, the task associated with node 1110 may be required to complete before the tasks associated with nodes 1112 may be executed. If a node includes more than one task, those tasks may be performed, at least in part, in parallel (e.g., substantially in parallel). The UI 1100 can also include any suitable combination of execution tasks corresponding to any suitable number of execution targets to be executed in series or parallel. The UI 1100 may display a list of each task, in the order in which the tasks are to be executed within area 1114. In some embodiments, tasks which may be performed in parallel may be displayed in any suitable order within the area 1114.

Figure 12:
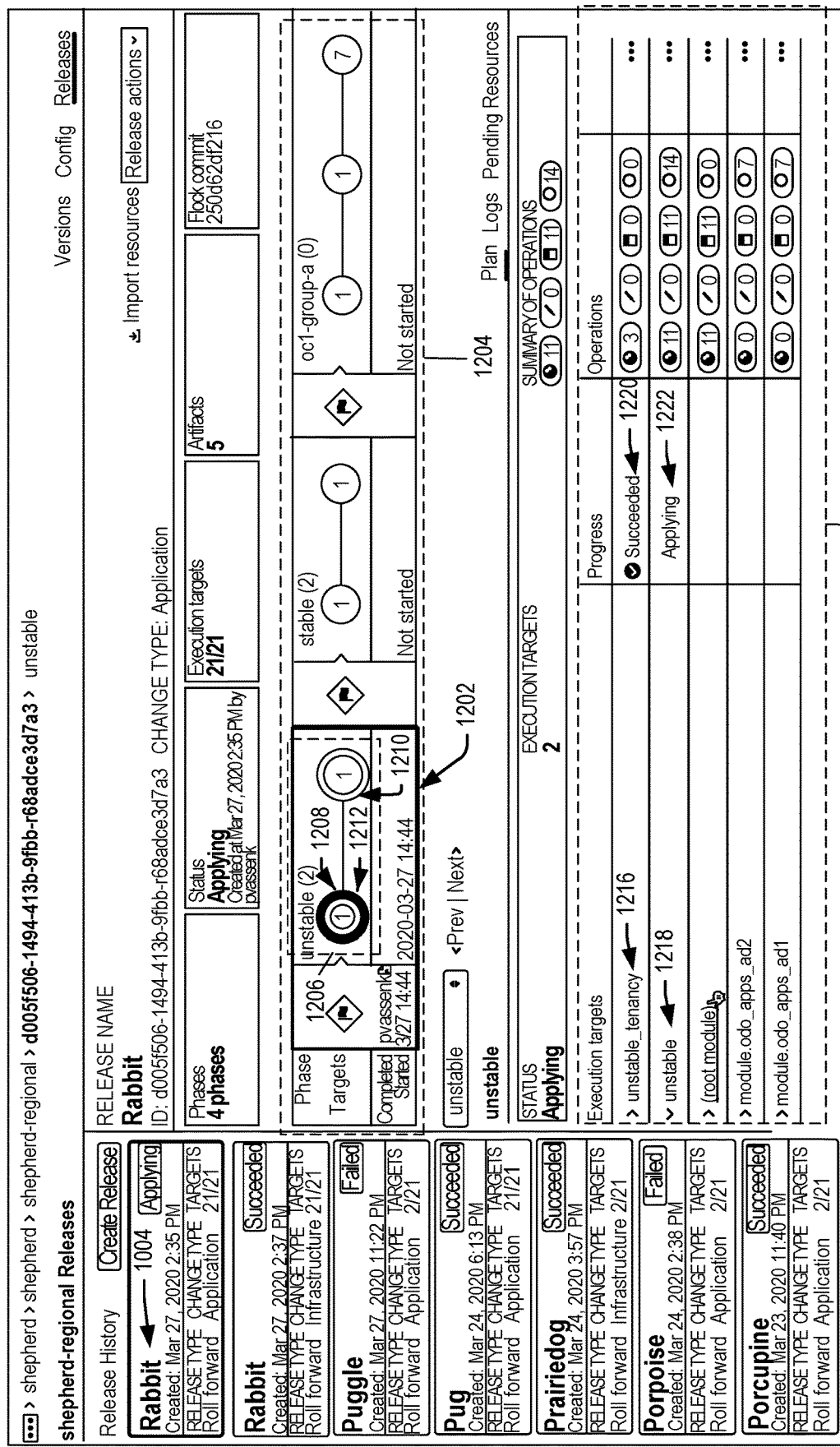
FIG. 12 is a schematic diagram illustrating an example user interface that depicts an example UI 1200 that depicts execution status related to one or more phases of a selected release, according to at least one embodiment.

FIG. 12 is a schematic diagram illustrating an example user interface (e.g., UI 1200) that depicts execution status related to one or more phases of a selected release, according to at least one embodiment. Phase 1202 may be located in progress bar 1204 (e.g., an example of the progress bar 1002 of FIG. 10) or in any other suitable location on the UI 1200. The phase 1002 can include a graph 1206 that indicates a particular sequence of task execution corresponding to node 1208 and node 1210. As depicted in the UI 1200, the task corresponding to the node 1208 may be executed before the task corresponding to the node 1210. The circular progress bar 1212 (e.g., an example of the circular progress bar 1007 of FIG. 10) may be utilized for each node to indicate status of the execution task(s) of each node. As depicted with the circular progress bar 1212, the task corresponding to a node 1208 may be complete, while a task corresponding to node 1210 may still be in progress.

The UI 1200 can also include the task list 1214. When the phase 1002 is selected, the execution target(s) corresponding to each task may be presented in task list 1214. As illustrated in the UI 1200, the execution task corresponding to node 1208 may be presented at 1216 and the execution task corresponding to node 1210 may be presented at 1218. Thus, in some embodiments, the execution tasks may be presented in an order corresponding to their execution order. Status 1220 and 1222 may be presented in task list 1214. Status 1220 may correspond to a textual display of the status corresponding to the node 1208 and the status 1222 may correspond to a textual display of the status corresponding to the node 1210.

Figure 13:
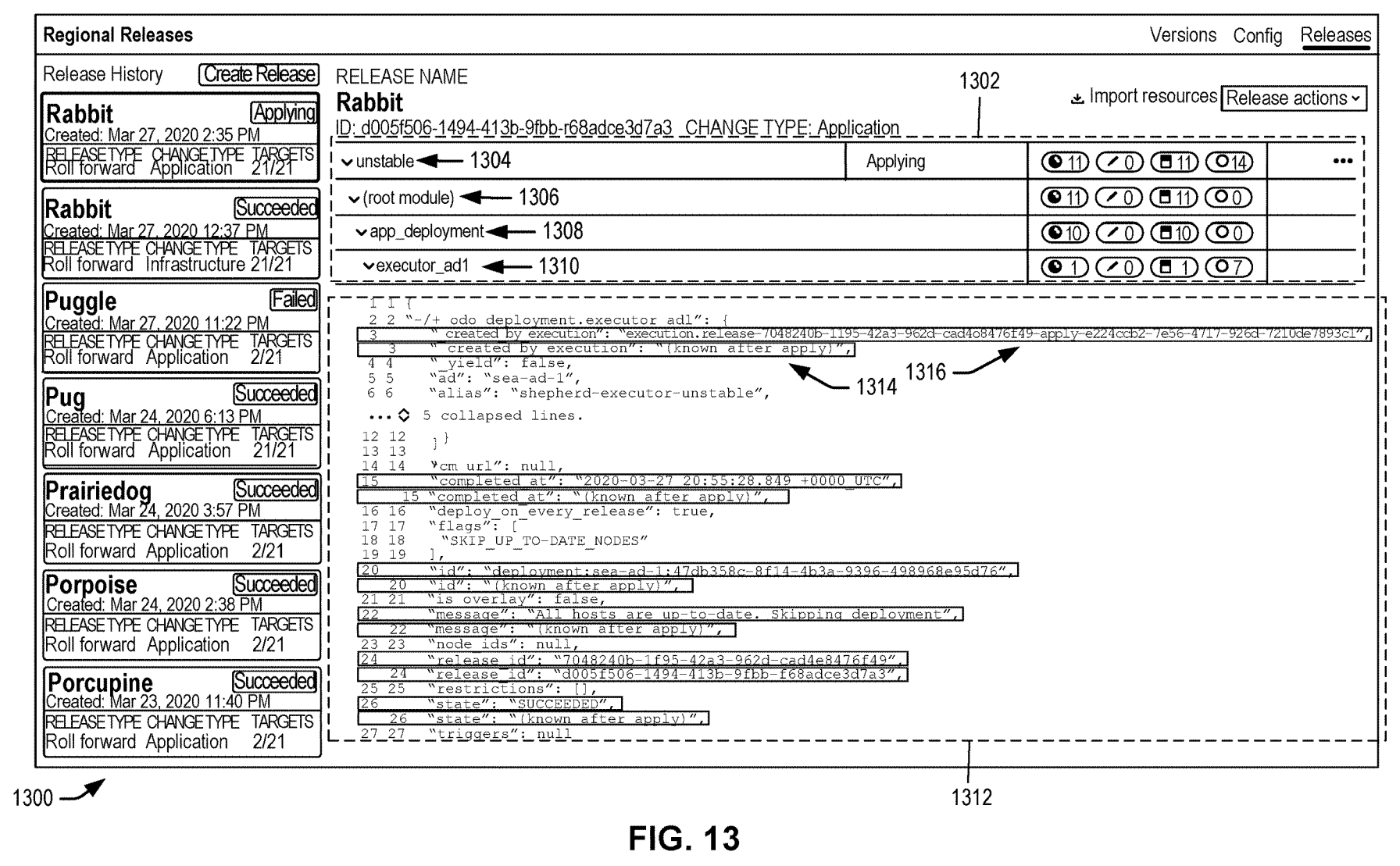

FIG. 13 is a schematic diagram illustrating an example user interface (e.g., UI 1300) that shows an example safety plan, according to at least one embodiment. The UI 1300 can include the execution task list 1302 (e.g., execution task list 1008 of FIG. 10), which can be located in any suitable location on the UI 1300, and as illustrated, the execution task list 1302 is at the top of the UI 1300. The execution task 1302 may correspond to modifying software resources associated with an execution target from a first state to a second state. In some embodiments, the UI 1300 may be utilized to present a set of changes to be made to those software resources as part of modifying the software resources from the first state to the second state. As depicted, the execution task list 1302 contains an execution task 1304 corresponding to a target (e.g., labeled "unstable") that, when selected, can display a module 1306, that, when selected in turn, can display module 1308 (labeled "app_deployment" as depicted) that, when selected, can module 1310. The execution target 1304 can display any suitable number of modules and/or application deployments corresponding to the execution task 1304. In an embodiment with more than one module 1306, the modules 1306 can be listed in order of descending number of create, update, delete, or no-change operations. By way of example, the modules 1306-1310 may be displayed such that the module with the highest number of creations may be listed at the top of the list and the remaining tasks may be displayed according to each task's corresponding number of creation operations in descending order. In some embodiments, the module 1306-1310 may be organized differently (e.g., in ascending order, or in any other suitable method for organizing modules 1306-1310). In some embodiments, when module 1310 is selected, UI 1300 may present a safety plan log 1312, and any other suitable information corresponding to the task 1304.

The safety plan log 1312 can be presented at any suitable location on the UI 1300, but as illustrated in the UI 1300, the safety plan log 1310 is located in the lower right corner of the UI 1300. The safety plan log can present information about a changes made to the application code corresponding to module 1310. For example, line 1314 may depict an added line of code while line 1316 may depict a deleted line of code that is being replaced with line 1314. In some embodiments, the line 1312 (and/or any portion of code to be added) can be displayed with a green background or any other color background suitable for identifying one or more lines of code to be added. The line 1314 (e.g., or any portion of code to be deleted) can be displayed with a red background of any other color background suitable for identifying one or more lines of code to be deleted.

Using the UI 1300, the user may be enabled to view each planned code changes for each portion of a task.

Figure 14:
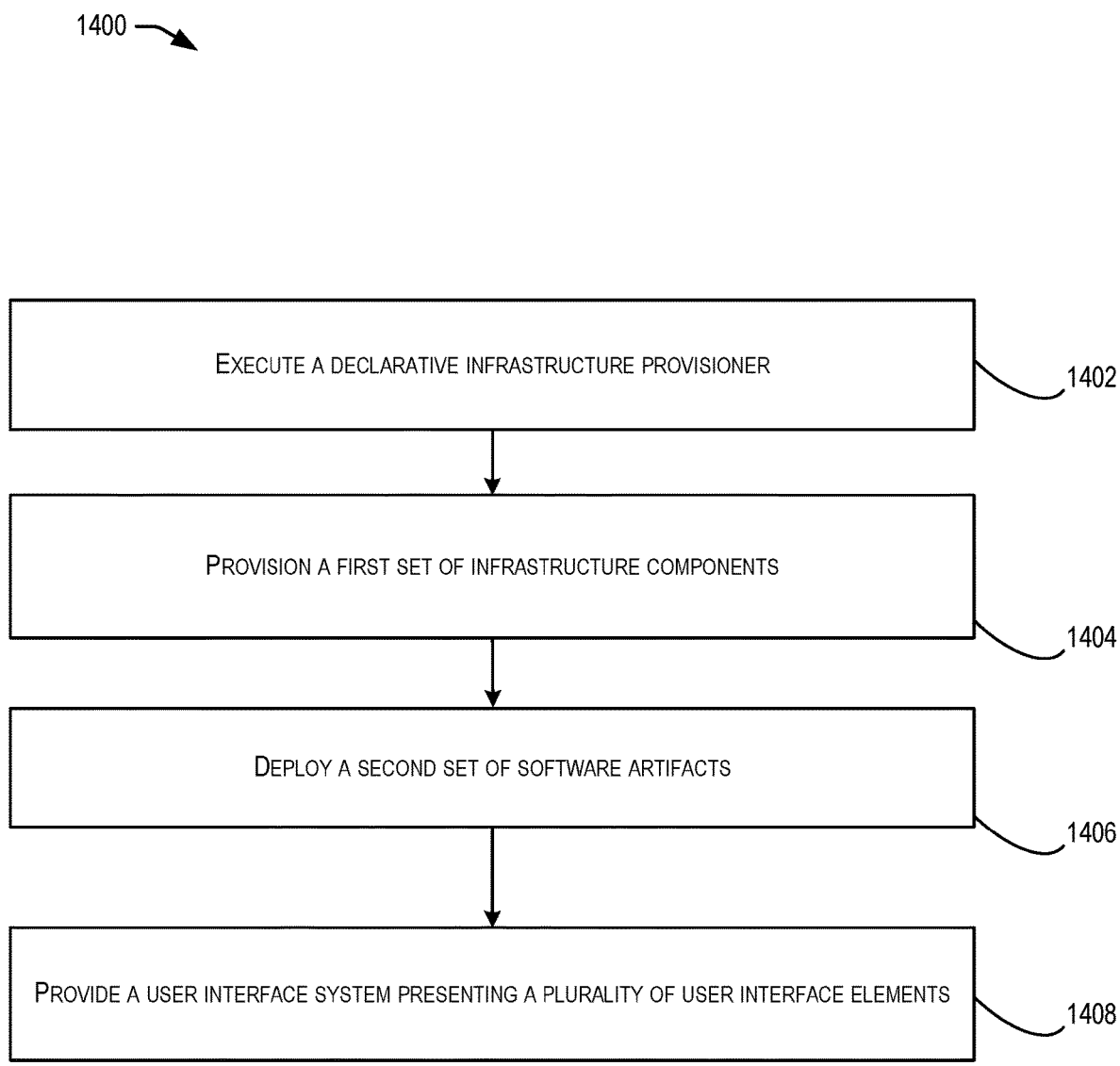
FIG. 14 is a flow diagram for describing an example process of generating a user interface for provisioning infrastructure, according to at least one embodiment.

FIG. 14 illustrates an example flow diagram showing process 1400 for implementing techniques of a CIOS, according to certain embodiments of the present disclosure. This process is illustrated as a logical flow diagram, each operation of which can be implemented in hardware, computer instructions, or a combination thereof. In the context of computer instructions, the operations may represent computer-executable instructions stored on one or more computer-readable storage media that, when executed by one or more processors, perform the recited operations. Generally, computer-executable instructions include routines, programs, objects, components, data structures and the like that perform particular functions or implement particular data types. The order in which the operations are described is not intended to be construed as a limitation, and any number of the described operations can be combined in any order and/or in parallel to implement the process.

Additionally, the process may be performed under the control of one or more computing devices or computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program including a plurality of instructions executable by one or more processors. In some embodiments, the process 1400 may be performed by a plurality of processors in parallel. The computer-readable storage medium may be non-transitory.

The process 1400 may begin at block 1402, in which a computing system executes a declarative infrastructure provisioner (e.g., CIOS Regional 202 of FIG. 2). As discussed above in connection with FIG. 2, a declarative infrastructure provisioner such as CIOS Regional 202 may provision resources using a declarative file that describes components and how they interact. The configuration file can describe the resource and the relevant fields needed to create the element, and then as other elements can be described that reference the previously described elements. In some examples, a provisioning tool can then generate a workflow for creating and managing the elements that are described in the configuration file. The declarative infrastructure provisioner may, in some embodiments, utilize declarative statements formatted according to Terraform, a tool for building, changing, and versioning infrastructure components.

The process 1400 may continue to block 1404, in which the computing system provisions a first set of infrastructure components. The first set of infrastructure components may be based at least in part on the computing system providing a first set of declarative instructions to the declarative infrastructure provisioner.

The process 1400 may continue to block 1406, in which the computing system deploys a second set of software artifacts. The second set of software artifacts may be based at least in part on the computing system providing a second set of declarative instructions to the declarative infrastructure provisioner.

The process 1400 may continue to block 1408, in which the computing system provides a user interface system that presents a set of user interface elements (e.g., the infrastructure area 502 and the application area 504 of FIG. 5, for example). The user interface elements can identify at least a first status (e.g., progress bar 510) associated with provisioning the first set of infrastructure components and a second status (e.g., progress bar 516) associated with deploying the second set of software artifacts.

It should be appreciated that the computing system may be configured to provide any suitable interface such as user interfaces 500-1300 of FIGS. 5-13 as described above.

Illustrative Systems

Figure 15:
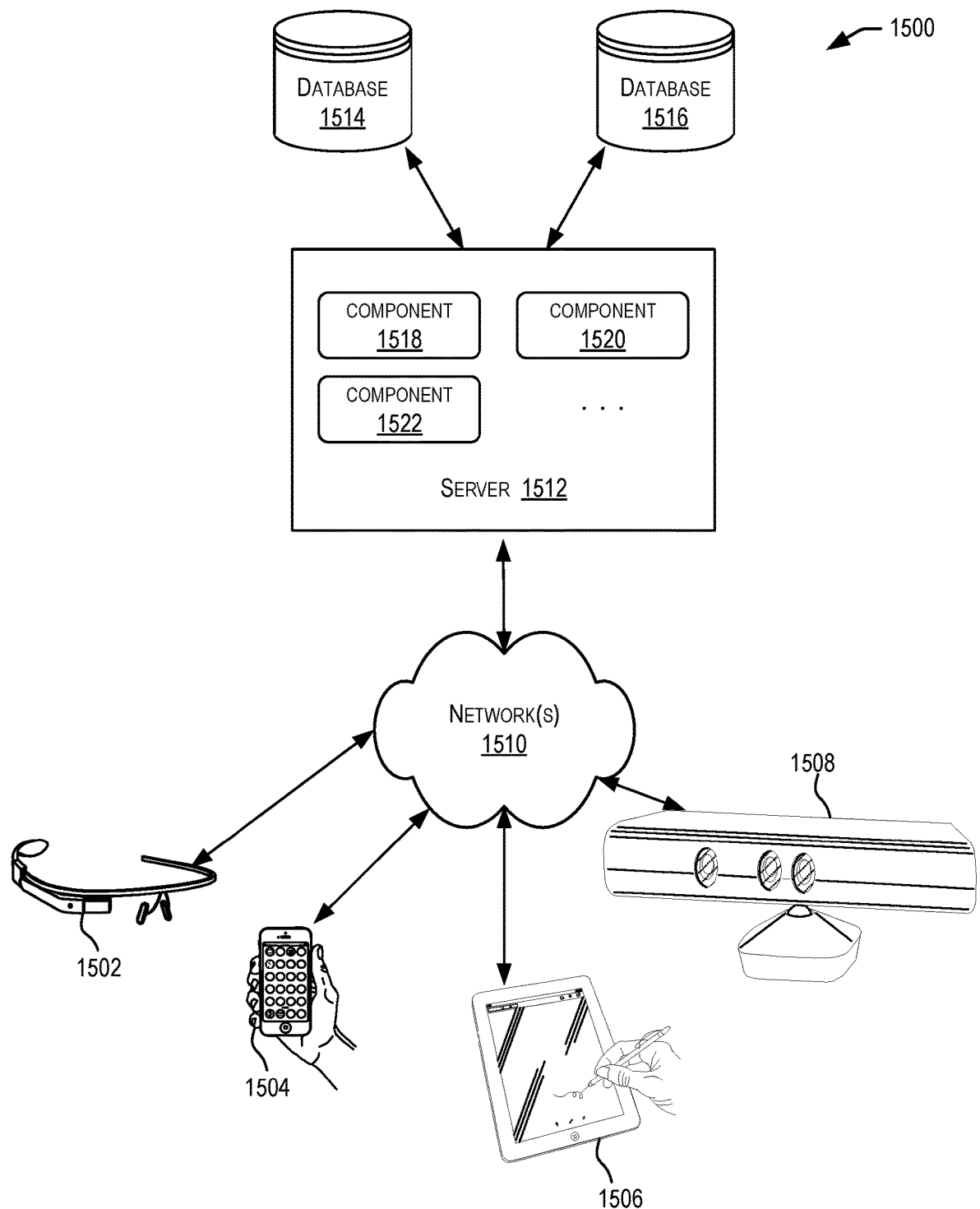
FIG. 15 is a block diagram of a distributed system, according to at least one embodiment.
Figure 16:
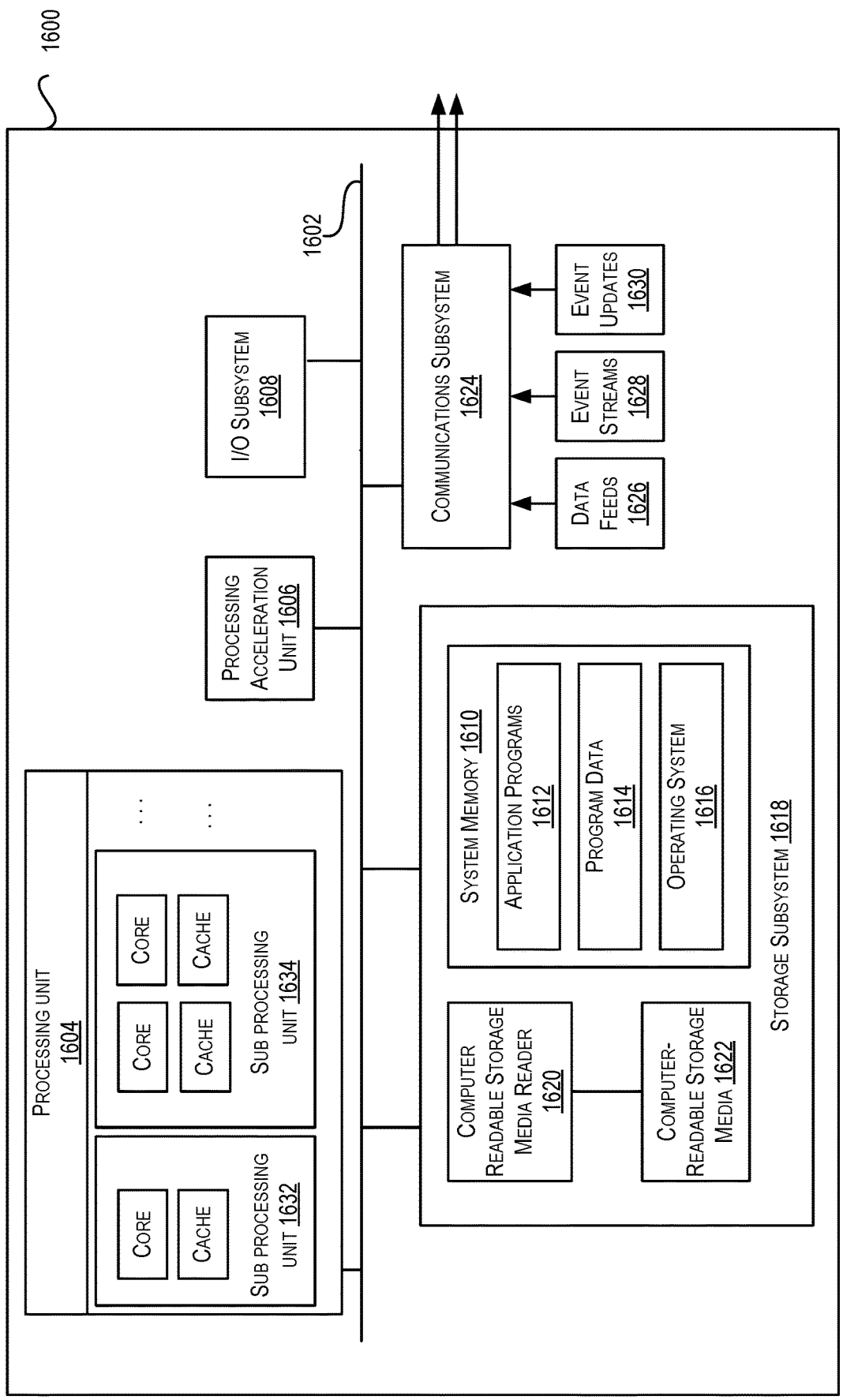
FIG. 16 is a block diagram of one or more components of a system environment by which services provided by one or more components of an embodiment system may be offered as cloud services, according to at least one embodiment.
Figure 17:
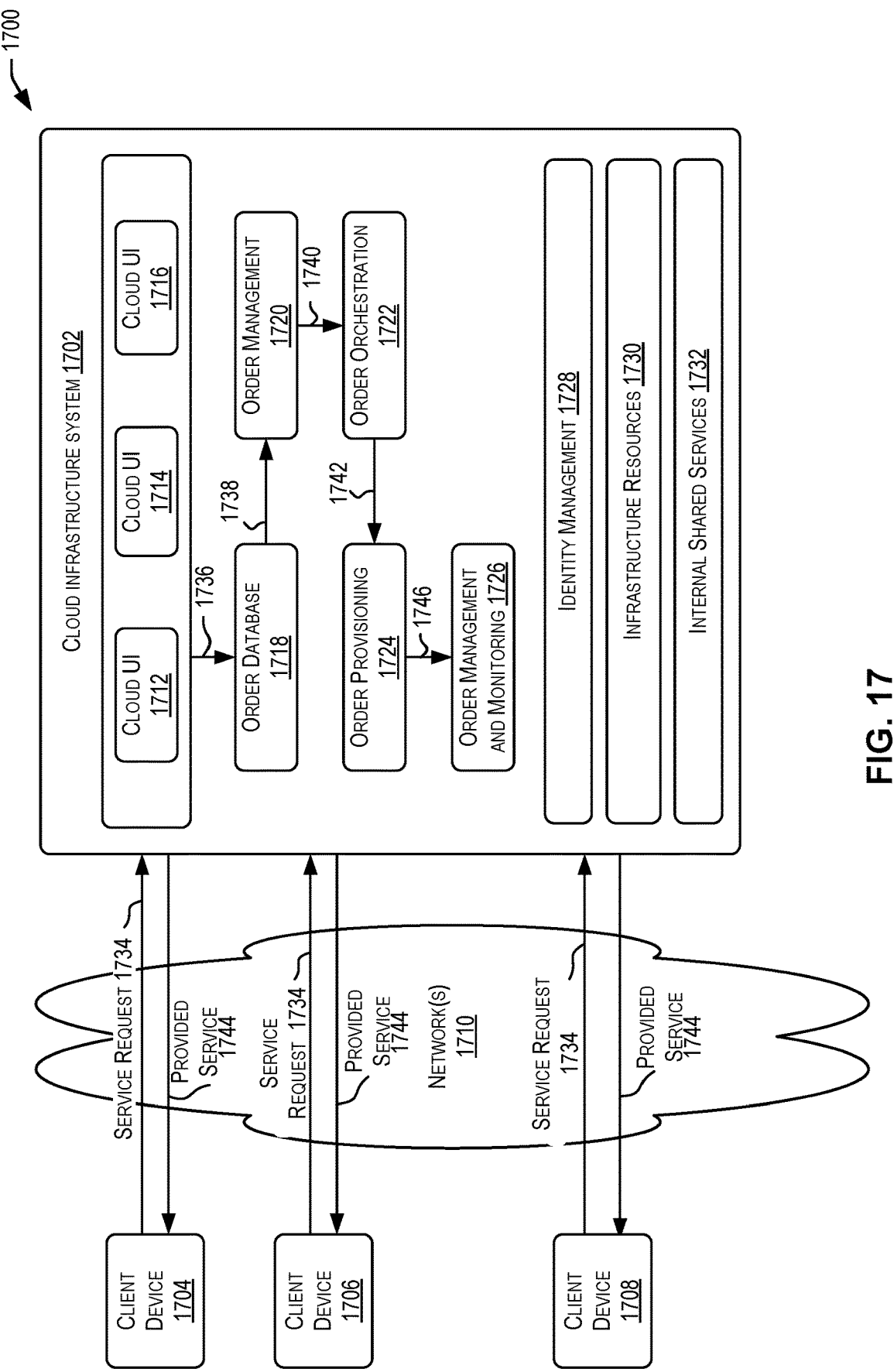
FIG. 17 is a block diagram of an example computer system, in which various embodiments of the present disclosure may be implemented.

FIGS. 15-17 illustrate aspects of example environments for implementing aspects of the present disclosure in accordance with various embodiments. FIG. 15 depicts a simplified diagram of a distributed system 1500 for implementing an embodiment of the present disclosure. In the illustrated embodiment, the distributed system 1500 includes one or more client computing devices 1502, 1504, 1506, and 1508, which are configured to execute and operate a client application such as a web browser, proprietary client (e.g., Oracle Forms), or the like over one or more network(s) 1510. The server 1512 may be communicatively coupled with the remote client computing devices 1502, 1504, 1506, and 1508 via network 1510.

In various embodiments, the server 1512 may be adapted to run one or more services or software applications such as services and applications that provide identity management services. In certain embodiments, the server 1512 may also provide other services or software applications can include non-virtual and virtual environments. In some embodiments, these services may be offered as web-based or cloud services or under a Software as a Service (SaaS) model to the users of the client computing devices 1502, 1504, 1506, and/or 1508. Users operating the client computing devices 1502, 1504, 1506, and/or 1508 may in turn utilize one or more client applications to interact with the server 1512 to utilize the services provided by these components.

In the configuration depicted in FIG. 15, the software components 1518, 1520 and 1522 of system 1500 are shown as being implemented on the server 1512. In other embodiments, one or more of the components of the system 1500 and/or the services provided by these components may also be implemented by one or more of the client computing devices 1502, 1504, 1506, and/or 1508. Users operating the client computing devices may then utilize one or more client applications to use the services provided by these components. These components may be implemented in hardware, firmware, software, or combinations thereof. It should be appreciated that various different system configurations are possible, which may be different from distributed system 1500. The embodiment shown in FIG. 15 is thus one example of a distributed system for implementing an embodiment system and is not intended to be limiting.

The client computing devices 1502, 1504, 1506, and/or 1508 may include various types of computing systems. For example, client device may include portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like. The devices may support various applications such as various Internet-related apps, e-mail, short message service (SMS) applications, and may use various other communication protocols. The client computing devices may also include general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Client computing devices may also include electronic devices such as a thin-client computer, an Internet-enabled gaming system (e.g., a Microsoft Xbox gaming console with or without a Kinect® gesture input device), and/or a personal messaging device, capable of communicating over the network(s) 1510.

Although distributed system 1500 in FIG. 15 is shown with four client computing devices, any number of client computing devices may be supported. Other devices, such as devices with sensors, etc., may interact with the server 1512.

The network(s) 1510 in the distributed system 1500 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk, and the like. Merely by way of example, the network(s) 1510 can be a local area network (LAN), networks based on Ethernet, Token-Ring, a wide-area network, the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 1002.11 suite of protocols, Bluetooth®, and/or any other wireless protocol), and/or any combination of these and/or other networks.

The server 1512 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. The server 1512 can include one or more virtual machines running virtual operating systems, or other computing architectures involving virtualization. One or more flexible pools of logical storage devices can be virtualized to maintain virtual storage devices for the server. Virtual networks can be controlled by the server 1512 using software defined networking. In various embodiments, the server 1512 may be adapted to run one or more services or software applications described in the foregoing disclosure. For example, the server 1512 may correspond to a server for performing processing as described above according to an embodiment of the present disclosure.

The server 1512 may run an operating system including any of those discussed above, as well as any commercially available server operating system. Server 1512 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Example database servers include without limitation those commercially available from Oracle, Microsoft, Sybase, IBM (International Business Machines), and the like.

In some implementations, the server 1512 may include one or more applications to analyze and consolidate data feeds and/or event updates received from users of the client computing devices 1502, 1504, 1506, and 1508. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. The server 1512 may also include one or more applications to display the data feeds and/or real-time events via one or more display devices of the client computing devices 1502, 1504, 1506, and 1508.

The distributed system 1500 may also include one or more databases 1514 and 1516. These databases may provide a mechanism for storing information such as user identity information, and other information used by embodiments of the present disclosure. Databases 1514 and 1516 may reside in a variety of locations. By way of example, one or more of databases 1514 and 1516 may reside on a non-transitory storage medium local to (and/or resident in) the server 1512. Alternatively, the databases 1514 and 1516 may be remote from the server 1512 and in communication with the server 1512 via a network-based or dedicated connection. In one set of embodiments, the databases 1514 and 1516 may reside in a storage-area network (SAN). Similarly, any necessary files for performing the functions attributed to the server 1512 may be stored locally on the server 1512 and/or remotely, as appropriate. In one set of embodiments, the databases 1514 and 1516 may include relational databases, such as databases provided by Oracle, that are adapted to store, update, and retrieve data in response to SQL-formatted commands.

FIG. 16 illustrates an example computer system 1600 that may be used to implement an embodiment of the present disclosure. In some embodiments, computer system 1600 may be used to implement any of the various servers and computer systems described above. As shown in FIG. 16, computer system 1600 includes various subsystems including a processing subsystem 1604 that communicates with a number of peripheral subsystems via a bus subsystem 1602. These peripheral subsystems may include a processing acceleration unit 1606, an I/O subsystem 1608, a storage subsystem 1618 and a communications subsystem 1624. Storage subsystem 1618 may include tangible computer-readable storage media 1622 and a system memory 1610.

Bus subsystem 1602 provides a mechanism for letting the various components and subsystems of computer system 1600 communicate with each other as intended. Although bus subsystem 1602 is shown schematically as a single bus, alternative embodiments of the bus subsystem may utilize multiple buses. Bus subsystem 1602 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 1604 controls the operation of computer system 1600 and may comprise one or more processing units 1632, 1634, etc. A processing unit may include be one or more processors, including single core or multicore processors, one or more cores of processors, or combinations thereof. In some embodiments, processing subsystem 1604 can include one or more special purpose co-processors such as graphics processors, digital signal processors (DSPs), or the like. In some embodiments, some or all of the processing units of processing subsystem 1604 can be implemented using customized circuits, such as application specific integrated circuits (ASICs), or field programmable gate arrays (FPGAs).

In some embodiments, the processing units in processing subsystem 1604 can execute instructions stored in system memory 1610 or on computer readable storage media 1622. In various embodiments, the processing units can execute a variety of programs or code instructions and can maintain multiple concurrently executing programs or processes. At any given time, some or all of the program code to be executed can be resident in system memory 1610 and/or on computer-readable storage media 1610 including potentially on one or more storage devices. Through suitable programming, processing subsystem 1604 can provide various functionalities described above for dynamically modifying documents (e.g., webpages) responsive to usage patterns.

In certain embodiments, a processing acceleration unit 1606 may be provided for performing customized processing or for off-loading some of the processing performed by processing subsystem 1604 so as to accelerate the overall processing performed by computer system 1600.

I/O subsystem 1608 may include devices and mechanisms for inputting information to computer system 1600 and/or for outputting information from or via computer system 1600. In general, use of the term "input device" is intended to include all possible types of devices and mechanisms for inputting information to computer system 1600. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1600 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 1618 provides a repository or data store for storing information that is used by computer system 1600. Storage subsystem 1618 provides a tangible non-transitory computer-readable storage medium for storing the basic programming and data constructs that provide the functionality of some embodiments. Software (programs, code modules, instructions) that when executed by processing subsystem 1604 provide the functionality described above may be stored in storage subsystem 1618. The software may be executed by one or more processing units of processing subsystem 1604. Storage subsystem 1618 may also provide a repository for storing data used in accordance with the present disclosure.

Storage subsystem 1618 may include one or more non-transitory memory devices, including volatile and non-volatile memory devices. As shown in FIG. 16, storage subsystem 1618 includes a system memory 1610 and a computer-readable storage media 1622. System memory 1610 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 1600, such as during start-up, may be stored in the ROM. The RAM may contain data and/or program modules that are presently being operated and executed by processing subsystem 1604. In some implementations, system memory 1610 may include multiple different types of memory, such as static random access memory (SRAM) or dynamic random access memory (DRAM).

By way of example, and not limitation, as depicted in FIG. 16, system memory 1610 may store application programs 1612, which may include client applications, Web browsers, mid-tier applications, relational database management systems (RDBMS), etc., program data 1614, and an operating system 1616. By way of example, operating system 1616 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Computer-readable storage media 1622 may store programming and data constructs that provide the functionality of some embodiments. Software (programs, code modules, instructions) that when executed by processing subsystem 1604 a processor provide the functionality described above may be stored in storage subsystem 1618. By way of example, computer-readable storage media 1622 may include non-volatile memory such as a hard disk drive, a magnetic disk drive, an optical disk drive such as a CD ROM, DVD, a Blu-Ray® disk, or other optical media. Computer-readable storage media 1622 may include, but is not limited to, Zip® drives, flash memory cards, universal serial bus (USB) flash drives, secure digital (SD) cards, DVD disks, digital video tape, and the like. Computer-readable storage media 1622 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. Computer-readable media 1622 may provide storage of computer-readable instructions, data structures, program modules, and other data for computer system 1600.

In certain embodiments, storage subsystem 1600 may also include a computer-readable storage media reader 1620 that can further be connected to computer-readable storage media 1622. Together and, optionally, in combination with system memory 1610, computer-readable storage media 1622 may comprehensively represent remote, local, fixed, and/or removable storage devices plus storage media for storing computer-readable information.

In certain embodiments, computer system 1600 may provide support for executing one or more virtual machines. Computer system 1600 may execute a program such as a hypervisor for facilitating the configuring and managing of the virtual machines. Each virtual machine may be allocated memory, compute (e.g., processors, cores), I/O, and networking resources. Each virtual machine may run its own operating system, which may be the same as or different from the operating systems executed by other virtual machines executed by computer system 1600. Accordingly, multiple operating systems may potentially be run concurrently by computer system 1600. Each virtual machine generally runs independently of the other virtual machines.

Communications subsystem 1624 provides an interface to other computer systems and networks. Communications subsystem 1624 serves as an interface for receiving data from and transmitting data to other systems from computer system 1600. For example, communications subsystem 1624 may enable computer system 1600 to establish a communication channel to one or more client devices via the Internet for receiving and sending information from and to the client devices. Additionally, communication subsystem 1624 may be used to communicate notifications of successful logins or notifications to re-enter a password from the privileged account manager to the requesting users.

Communication subsystem 1624 may support both wired and/or wireless communication protocols. For example, in certain embodiments, communications subsystem 1624 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1624 can provide wired network connectivity (e.g., Ethernet) in addition to or instead of a wireless interface.

Communication subsystem 1624 can receive and transmit data in various forms. For example, in some embodiments, communications subsystem 1624 may receive input communication in the form of structured and/or unstructured data feeds 1626, event streams 1628, event updates 1630, and the like. For example, communications subsystem 1624 may be configured to receive (or send) data feeds 1626 in real-time from users of social media networks and/or other communication services such as Twitter® feeds, Facebook® updates, web feeds such as Rich Site Summary (RSS) feeds, and/or real-time updates from one or more third party information sources.

In certain embodiments, communications subsystem 1624 may be configured to receive data in the form of continuous data streams, which may include event streams 1628 of real-time events and/or event updates 1630, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1624 may also be configured to output the structured and/or unstructured data feeds 1626, event streams 1628, event updates 1630, and the like to one or more databases that may be in communication with one or more streaming data source computers coupled to computer system 1600.

Computer system 1600 can be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system.

Due to the ever-changing nature of computers and networks, the description of computer system 1600 depicted in FIG. 16 is intended only as a specific example. Many other configurations having more or fewer components than the system depicted in FIG. 16 are possible. Based on the disclosure and teachings provided herein, a person of ordinary skill in the art will appreciate other ways and/or methods to implement the various embodiments.

Systems depicted in some of the figures may be provided in various configurations. In some embodiments, the systems may be configured as a distributed system where one or more components of the system are distributed across one or more networks in one or more cloud infrastructure systems.

A cloud infrastructure system is a collection of one or more server computing devices, network devices, and/or storage devices. These resources may be divided by cloud services providers and allotted to its customers in some manner. For example, a cloud services provider, such as Oracle Corporation of Redwood Shores, California, may offer various types of cloud services including but not limited to one or more services provided under Software as a Service (Saas) category, services provided under Platform as a Service (PaaS) category, services provided under Infrastructure as a Service (IaaS) category, or other categories of services including hybrid services. Examples of SaaS services include, without limitation, capabilities to build and deliver a suite of on-demand applications such as Oracle Fusion applications. SaaS services enable customers to utilize applications executing on the cloud infrastructure system without the need for customers to purchase software for the applications. Examples of PaaS services include without limitation services that enable organizations (such as Oracle) to consolidate existing applications on a shared, common architecture, as well as the ability to build new applications that leverage the shared services provided by the platform such as Oracle Java Cloud Service (JCS), Oracle Database Cloud Service (DBCS), and others. IaaS services may facilitate the management and control of the underlying computing resources, such as storage, networks, and other fundamental computing resources for customers utilizing services provided by the SaaS platform and the PaaS platform.

FIG. 17 is a simplified block diagram of one or more components of a system environment 1700 by which services provided by one or more components of an embodiment system may be offered as cloud services, in accordance with an embodiment of the present disclosure. In the illustrated embodiment, system environment 1700 includes one or more client computing devices 1704, 1706, and 1708 that may be used by users to interact with a cloud infrastructure system 1702 that provides cloud services. The client computing devices may be configured to operate a client application such as a web browser, a proprietary client application (e.g., Oracle Forms), or some other application, which may be used by a user of the client computing device to interact with cloud infrastructure system 1702 to use services provided by cloud infrastructure system 1702.

It should be appreciated that cloud infrastructure system 1702 depicted in the figure may have other components than those depicted. Further, the embodiment shown in the figure is only one example of a cloud infrastructure system that may incorporate an embodiment of the disclosure. In some other embodiments, cloud infrastructure system 1702 may have more or fewer components than shown in the figure, may combine two or more components, or may have a different configuration or arrangement of components.

Client computing devices 1704, 1706, and 1708 may be devices similar to those described above for 1502, 1504, 1506, and 1508.

Although example system environment 1700 is shown with three client computing devices, any number of client computing devices may be supported. Other devices such as devices with sensors, etc. may interact with cloud infrastructure system 1702.

Network(s) 1710 may facilitate communications and exchange of data between clients 1704, 1706, and 1708 and cloud infrastructure system 1702. Each network may be any type of network familiar to those skilled in the art that can support data communications using any of a variety of commercially-available protocols, including those described above for network(s) 1510.

Cloud infrastructure system 1702 may comprise one or more computers and/or servers that may include those described above for server 1512.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." In a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 1702 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

In various embodiments, cloud infrastructure system 1702 may be adapted to automatically provision, manage and track a customer's subscription to services offered by cloud infrastructure system 1702. Cloud infrastructure system 1702 may provide the cloud services via different deployment models. For example, services may be provided under a public cloud model in which cloud infrastructure system 1702 is owned by an organization selling cloud services (e.g., owned by Oracle) and the services are made available to the general public or different industry enterprises. As another example, services may be provided under a private cloud model in which cloud infrastructure system 1702 is operated solely for a single organization and may provide services for one or more entities within the organization. The cloud services may also be provided under a community cloud model in which cloud infrastructure system 1702 and the services provided by cloud infrastructure system 1702 are shared by several organizations in a related community. The cloud services may also be provided under a hybrid cloud model, which is a combination of two or more different models.

In some embodiments, the services provided by cloud infrastructure system 1702 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 1702. Cloud infrastructure system 1702 then performs processing to provide the services in the customer's subscription order.

In some embodiments, the services provided by cloud infrastructure system 1702 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 1702 may also include infrastructure resources 1730 for providing the resources used to provide various services to customers of the cloud infrastructure system. In one embodiment, infrastructure resources 1730 may include pre-integrated and optimized combinations of hardware, such as servers, storage, and networking resources to execute the services provided by the PaaS platform and the SaaS platform.

In some embodiments, resources in cloud infrastructure system 1702 may be shared by multiple users and dynamically re-allocated per demand. Additionally, resources may be allocated to users in different time zones. For example, cloud infrastructure system 1730 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 1732 may be provided that are shared by different components or modules of cloud infrastructure system 1702 and by the services provided by cloud infrastructure system 1702. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 1702 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 1702, and the like.

In one embodiment, as depicted in the figure, cloud management functionality may be provided by one or more modules, such as an order management module 1720, an order orchestration module 1722, an order provisioning module 1724, an order management and monitoring module 1726, and an identity management module 1728. These modules may include or be provided using one or more computers and/or servers, which may be general purpose computers, specialized server computers, server farms, server clusters, or any other appropriate arrangement and/or combination.

In example operation 1734, a customer using a client device, such as client device 1704, 1706 or 1708, may interact with cloud infrastructure system 1702 by requesting one or more services provided by cloud infrastructure system 1702 and placing an order for a subscription for one or more services offered by cloud infrastructure system 1702. In certain embodiments, the customer may access a cloud User Interface (UI), cloud UI 1712, cloud UI 1714 and/or cloud UI 1716 and place a subscription order via these UIs. The order information received by cloud infrastructure system 1702 in response to the customer placing an order may include information identifying the customer and one or more services offered by the cloud infrastructure system 1702 that the customer intends to subscribe to.

After an order has been placed by the customer, the order information is received via the cloud UIs, 1712, 1714 and/or 1716.

At operation 1736, the order is stored in order database 1718. Order database 1718 can be one of several databases operated by cloud infrastructure system 1718 and operated in conjunction with other system elements.

At operation 1738, the order information is forwarded to an order management module 1720. In some instances, order management module 1720 may be configured to perform billing and accounting functions related to the order, such as verifying the order, and upon verification, booking the order.

At operation 1740, information regarding the order is communicated to an order orchestration module 1722. Order orchestration module 1722 may utilize the order information to orchestrate the provisioning of services and resources for the order placed by the customer. In some instances, order orchestration module 1722 may orchestrate the provisioning of resources to support the subscribed services using the services of order provisioning module 1724.

In certain embodiments, order orchestration module 1722 enables the management of business processes associated with each order and applies business logic to determine whether an order should proceed to provisioning. At operation 1742, upon receiving an order for a new subscription, order orchestration module 1722 sends a request to order provisioning module 1724 to allocate resources and configure those resources needed to fulfill the subscription order. Order provisioning module 1724 enables the allocation of resources for the services ordered by the customer. Order provisioning module 1724 provides a level of abstraction between the cloud services provided by cloud infrastructure system 1700 and the physical implementation layer that is used to provision the resources for providing the requested services. Order orchestration module 1722 may thus be isolated from implementation details, such as whether or not services and resources are actually provisioned on the fly or pre-provisioned and only allocated/assigned upon request.

At operation 1744, once the services and resources are provisioned, a notification of the provided service may be sent to customers on client devices 1704, 1706 and/or 1708 by order provisioning module 1724 of cloud infrastructure system 1702. At operation 1746, the customer's subscription order may be managed and tracked by an order management and monitoring module 1726. In some instances, order management and monitoring module 1726 may be configured to collect usage statistics for the services in the subscription order, such as the amount of storage used, the amount data transferred, the number of users, and the amount of system up time and system down time.

In certain embodiments, cloud infrastructure system 1700 may include an identity management module 1728. Identity management module 1728 may be configured to provide identity services, such as access management and authorization services in cloud infrastructure system 1700. In some embodiments, identity management module 1728 may control information about customers who wish to utilize the services provided by cloud infrastructure system 1702. Such information can include information that authenticates the identities of such customers and information that describes which actions those customers are authorized to perform relative to various system resources (e.g., files, directories, applications, communication ports, memory segments, etc.). Identity management module 1728 may also include the management of descriptive information about each customer and about how and by whom that descriptive information can be accessed and modified.

Although specific embodiments of the disclosure have been described, various modifications, alterations, alternative constructions, and equivalents are also encompassed within the scope of the disclosure. Embodiments of the present disclosure are not restricted to operation within certain specific data processing environments, but are free to operate within a plurality of data processing environments. Additionally, although embodiments of the present disclosure have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments of the present disclosure have been described using a particular combination of hardware and software, it should be recognized that other combinations of hardware and software are also within the scope of the present disclosure. Embodiments of the present disclosure may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

What is claimed is:

1. A computer-implemented method, comprising:
   executing, by a computing system, a declarative infrastructure provisioner configured to manage provisioning infrastructure resources and deploying artifacts of a cloud computing environment in accordance with a configuration file comprising declarative statements describing one or more infrastructure resources to be provisioned and one or more software artifacts to be deployed to the cloud computing environment;
   executing an infrastructure release based at least in part on provisioning, by the computing system, a set of infrastructure components across a first plurality of execution targets based at least in part on a first set of declarative statements of the configuration file;
   executing an application release based at least in part on deploying, by the computing system, a set of software artifacts to respective infrastructure components across a second plurality of execution targets based at least in part on a second set of declarative statements of the configuration file; and
   providing, by the computing system, a user interface presenting:
   i) a first area presenting first release status corresponding to each execution of a plurality of infrastructure releases comprising the infrastructure release,
   ii) a second area presenting second release corresponding to each execution of a plurality of application releases comprising the application release, and
   iii) a third area presenting a first status of executing the infrastructure release at a particular execution target and a second status of executing the application release at the particular execution target, the first area, the second area, and the third area being adjacent to each other and simultaneously visible.

2. The computer-implemented method of claim 1, wherein each execution target of the first plurality of execution targets and the second plurality of execution targets correspond to a respective region comprising at least one physical location.

3. The computer-implemented method of claim 2 further comprising presenting, by the computing system, a visual representation of progress corresponding to a phase of a plurality of phases, each phase of the plurality of phases being associated with provisioning a respective subset of the set of infrastructure components to a subset of the first plurality of execution targets or deploying a respective subset of the set of software artifacts to a subset of the second plurality of execution targets, the plurality of phases being associated with a predefined order of execution for provisioning to the subset of the first plurality of execution targets or deploying to the subset of the second plurality of execution targets.

4. The computer-implemented method of claim 3, wherein presenting the visual representation of progress corresponding to the phase comprises presenting, within the visual representation of progress corresponding to the phase, respective indicators of status corresponding to the provisioning to the subset of the first plurality of execution targets or the deploying to the subset of the second plurality of execution targets.

5. The computer-implemented method of claim 1, further comprising:
 identifying, by the computing system, a previous configuration of a software artifact of the set of software artifacts;
 identifying, by the computing system, a new configuration of the software artifact based at least in part on deploying the set of software artifacts; and
 providing, by the computing system and via the user interface, an indication of a change from the previous configuration to the new configuration of the software artifact.

6. The computer-implemented method of claim 1, further comprising:
 detecting, by the computing system, a failure in provisioning of at least one infrastructure component of the set of infrastructure components;
 presenting, by the computing system and via the user interface, an indication of the failure;
 receiving, by the computing system, user input; and
 performing, by the computing system, at least one remedial action in response to the user input.

7. The computer-implemented method of claim 1, further comprising:
 detecting, by the computing system, a failure in deployment of at least one software artifact of the set of software artifacts;
 presenting, by the computing system and via the user interface, an indication of the failure;
 receiving, by the computing system, user input; and
 performing, by the computing system, at least one remedial action in response to the user input.

8. The computer-implemented method of claim 1, wherein deploying the set of software artifacts comprises modifying software resources associated with an execution target of the second plurality of execution targets from a first state to a second state, and the computer-implemented method further comprising presenting, by the computing system, a set of changes to be made to the software resources as part of modifying the software resources from the first state to the second state.

9. A system, comprising:
 one or more processors; and
 one or more memories storing computer-executable instructions that, when executed by the one or more processors, causes the system to:
  execute a declarative infrastructure provisioner configured to manage provisioning infrastructure resources and deploying artifacts of a cloud computing environment in accordance with a configuration file comprising declarative statements describing one or more infrastructure resources to be provisioned and one or more software artifacts to be deployed to the cloud computing environment;
  execute an infrastructure release based at least in part on provisioning a set of infrastructure components across a first plurality of execution targets based at least in part on a first set of declarative statements of the configuration file;
  executing an application release based at least in part on deploying a set of software artifacts to respective infrastructure components across a second plurality of execution targets based at least in part on a second set of declarative statements of the configuration file; and
  provide a user interface presenting:
   i) a first area presenting first release status corresponding to each execution of a plurality of infrastructure releases comprising the infrastructure release,
   ii) a second area presenting second release corresponding to each execution of a plurality of application releases comprising the application release, and
   iii) a third area presenting a first status of executing the infrastructure release at a particular execution target and a second status of executing the application release at the particular execution target, the first area, the second area, and the third area being adjacent to each other and simultaneously visible.

10. The system of claim 9, wherein each execution target of the first plurality of execution targets and the second plurality of execution targets correspond to a respective region comprising at least one physical location.

11. The system of claim 9, wherein executing the instructions further causes the system to:
 identify a previous configuration of a software artifact of the set of software artifacts;
 identify a new configuration of the software artifact based at least in part on deploying the set of software artifacts; and
 provide, via the user interface, an indication of a change from the previous configuration to the new configuration of the software artifact.

12. The system of claim 9, wherein executing the instructions further causes the system to:
 detect a failure in provisioning of at least one infrastructure component of the set of infrastructure components or in deployment of at least one software artifact of the set of software artifacts;
 present, via the user interface, an indication of the failure;
 receive user input; and
 perform at least one remedial action in response to the user input.

13. A non-transitory computer-readable storage medium comprising one or more processors and one or more memories storing computer-executable instructions that, when executed by the one or more processors, cause a computing device to:
 execute a declarative infrastructure provisioner configured to manage provisioning infrastructure resources and deploying artifacts of a cloud computing environment in accordance with a configuration file comprising declarative statements describing one or more infrastructure resources to be provisioned and one or more software artifacts to be deployed to the cloud computing environment;
 execute an infrastructure release based at least in part on provisioning a set of infrastructure components across a first plurality of execution targets based at least in part on a first set of declarative statements of the configuration file;
 executing an application release based at least in part on deploying a set of software artifacts to respective infrastructure components across a second plurality of execution targets based at least in part on a second set of declarative statements of the configuration file; and provide a user interface presenting:
  i) a first area presenting first release status corresponding to each execution of a plurality of infrastructure releases comprising the infrastructure release,
  ii) a second area presenting second release corresponding to each execution of a plurality of application releases comprising the application release, and
  iii) a third area presenting a first status of executing the infrastructure release at a particular execution target and a second status of executing the application release at the particular execution target, the first area, the second area, and the third area being adjacent to each other and simultaneously visible.

14. The non-transitory computer-readable storage medium of claim 13, wherein each execution target of the first plurality of execution targets and the second plurality of execution targets correspond to a respective region comprising at least one physical location.

15. The non-transitory computer-readable storage medium of claim 13, wherein executing the instructions further causes the computing device to present a visual representation of progress corresponding to a phase of a plurality of phases, each phase of the plurality of phases being associated with provisioning a respective subset of the set of infrastructure components to a subset of the first plurality of execution targets or deploying a respective subset of the set of software artifacts to a subset of the second plurality of execution targets, the plurality of phases being associated with a predefined order of execution for provisioning to the subset of the first plurality of execution targets or deploying to the subset of the second plurality of execution targets.

16. The non-transitory computer-readable storage medium of claim 13, wherein executing the instructions further causes the computing device to:
  identify a previous configuration of a software artifact of the set of software artifacts;
  identify a new configuration of the software artifact based at least in part on deploying the set of software artifacts; and
  provide, via the user interface, an indication of a change from the previous configuration to the new configuration of the software artifact.

17. The non-transitory computer-readable storage medium of claim 13, wherein executing the instructions further causes the computing device to:
  detect a failure in provisioning of at least one infrastructure component of the set of infrastructure components or in deployment of at least one software artifact of the set of software artifacts;
  present, via the user interface, an indication of the failure;
  receive user input; and
  perform at least one remedial action in response to the user input.

18. The non-transitory computer-readable storage medium of claim 13, wherein deploying the set of software artifacts comprises modifying software resources associated with an execution target of the second plurality of execution targets from a first state to a second state, wherein executing the instructions further causes the computing device to present a set of changes to be made to the software resources as part of modifying the software resources from the first state to the second state.

19. The computer-implemented method of claim 1, wherein a first number corresponding to the first plurality of execution targets is identified in the first area, and wherein a second number corresponding to the second plurality of execution targets is identified in the second area.

20. The computer-implemented method of claim 1, wherein the third area presents infrastructure release status and application release status for each of a third plurality of execution targets, the third plurality of execution targets comprising the first plurality of execution targets and the second plurality of execution targets.

* * * * *